United States Patent
Le Traon et al.

(10) Patent No.: US 12,498,222 B2
(45) Date of Patent: Dec. 16, 2025

(54) HIGH-QUALITY-FACTOR FLEXURAL-VIBRATION RESONATOR FOR PRODUCING TIME REFERENCES FORCE SENSORS OR GYROMETERS

(71) Applicant: OFFICE NATIONAL D'ETUDES ET DE RECHERCHES AÉROSPATIALES, Palaiseau (FR)

(72) Inventors: Olivier Le Traon, Palaiseau (FR); Raphaël Levy, Palaiseau (FR); Jean Guerard, Palaiseau (FR); Thomas Perrier, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 240 days.

(21) Appl. No.: 18/546,396

(22) PCT Filed: Mar. 3, 2022

(86) PCT No.: PCT/FR2022/050381
§ 371 (c)(1),
(2) Date: Aug. 14, 2023

(87) PCT Pub. No.: WO2022/189734
PCT Pub. Date: Sep. 15, 2022

(65) Prior Publication Data
US 2024/0133691 A1    Apr. 25, 2024

(30) Foreign Application Priority Data

Mar. 10, 2021    (FR) ........................................ 2102248

(51) Int. Cl.
G01L 1/16        (2006.01)
G01C 19/5733    (2012.01)
G01L 5/04       (2006.01)

(52) U.S. Cl.
CPC .......... G01C 19/5733 (2013.01); G01L 1/162 (2013.01); G01L 5/042 (2013.01)

(58) Field of Classification Search
CPC . G01C 19/5733; G01C 19/5607; G01L 1/162; G01L 5/042; G04B 17/045;
(Continued)

(56) References Cited

U.S. PATENT DOCUMENTS 3,683,213 A    8/1972  Staudte
4,215,570 A    8/1980  Nisse
(Continued)

FOREIGN PATENT DOCUMENTS

FR    2574209 A1    6/1986
FR    2739190 A1    3/1997
(Continued)

OTHER PUBLICATIONS

Omura et al., "New Resonant Accelerometer Based on Rigidity Change", TRANSUCERS '97, 1997 International Conference on Solid-State Sensors and Actuators, Jun. 16-19, 1997, pp. 855-858.
(Continued)

Primary Examiner — Freddie Kirkland, III
(74) Attorney, Agent, or Firm — Maier & Maier, PLLC

(57) ABSTRACT

A resonator is suitable for reducing or suppressing a force transmitted by a vibrating portion of the resonator to a support part. To this end, the vibrating portion includes two extensions which are each meander shaped such that two segments of each extension have respective speed components that are oriented in opposite directions. Such a resonator, which is balanced, can advantageously be used within a rate gyro or a force sensor.

11 Claims, 11 Drawing Sheets

(58) Field of Classification Search
CPC ... H03H 2003/026; H03H 2009/02291; H03H 2009/02307; H03H 2009/0233; H03H 9/215; H03H 9/21
See application file for complete search history.

(56) References Cited

U.S. PATENT DOCUMENTS

| | | | |
|---|---|---|---|
| 4,524,619 A | 6/1985 | Staudte | |
| 4,710,668 A | 12/1987 | Fima et al. | |
| 6,386,035 B2 * | 5/2002 | Janiaud | G01P 15/097 73/514.01 |
| 6,414,416 B1 | 7/2002 | Janiaud et al. | |
| 6,437,483 B2 * | 8/2002 | Kikuchi | G01C 19/5607 310/321 |
| 6,747,393 B2 * | 6/2004 | Kikuchi | G01C 19/5607 310/321 |
| 6,898,832 B2 * | 5/2005 | Kawashima | H03H 3/02 29/25.35 |
| 7,122,945 B2 * | 10/2006 | Satoh | H03H 9/21 310/370 |
| 7,845,063 B2 * | 12/2010 | Kawashima | H10N 30/01 29/609.1 |
| 9,203,135 B2 * | 12/2015 | Kawashima | H03H 9/0547 |
| 9,866,200 B2 * | 1/2018 | Hsu | H03H 9/02259 |
| 9,923,545 B2 * | 3/2018 | Clark | H02N 1/008 |
| 2001/0043026 A1 | 11/2001 | Kikuchi et al. | |
| 2002/0166379 A1 * | 11/2002 | Paros | G01C 19/5607 73/504.16 |
| 2003/0169118 A1 * | 9/2003 | Kawashima | H03H 9/0547 331/158 |
| 2003/0197566 A1 * | 10/2003 | Kawashima | H03B 5/36 331/156 |
| 2006/0201248 A1 | 9/2006 | Unno | |
| 2009/0115294 A1 * | 5/2009 | Kikushima | H10N 30/87 310/370 |
| 2012/0279303 A1 | 11/2012 | Le Traon et al. | |
| 2016/0118954 A1 | 4/2016 | Clark | |

FOREIGN PATENT DOCUMENTS

| | | |
|---|---|---|
| FR | 2805344 A1 | 8/2001 |
| FR | 2944102 A1 | 10/2010 |
| JP | 2005068690 A | 3/2005 |
| WO | 2020212648 A1 | 10/2020 |

OTHER PUBLICATIONS

Jean Guerard, et al., "Quartz structures for Coriolis Vibrating Gyroscopes", Physics and Instrumentation Department, Onera, IEEE, downloaded Aug. 4, 2023, 4 pages.

Clarence Zener, "Internal Friction in Solids", Physical Review, I. Theory of Internal Friction in Reeds, vol. 52, Aug. 1, 1937, pp. 230-235 (6 pages).

International Search Report and Written Opinion of the ISA for PCT/FR2022/050381 mailed Jun. 21, 2022, 13 pages.

* cited by examiner

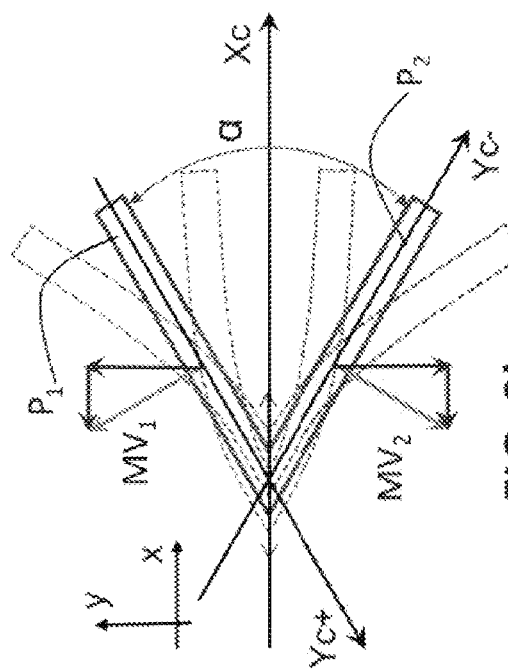
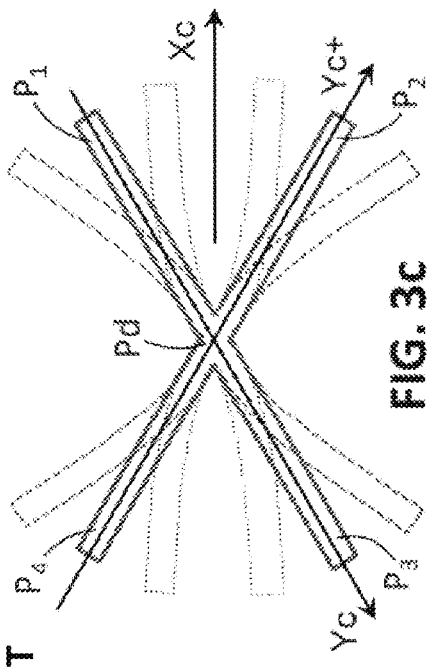
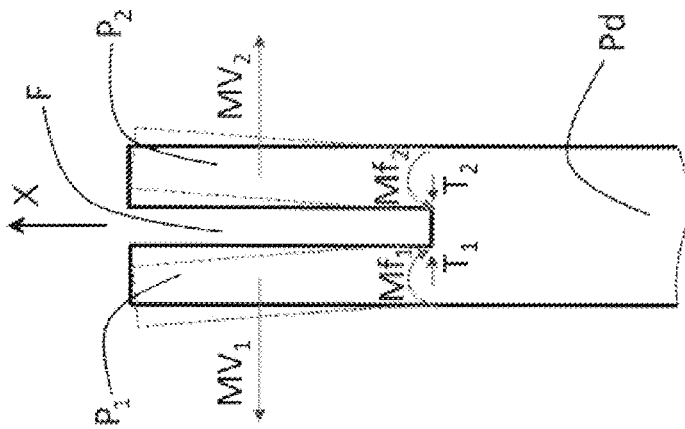
FIG. 3b
PRIOR ART
FIG. 3c
PRIOR ART
FIG. 3a
PRIOR ART

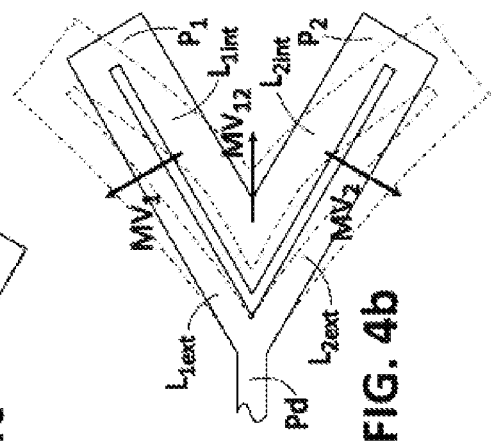
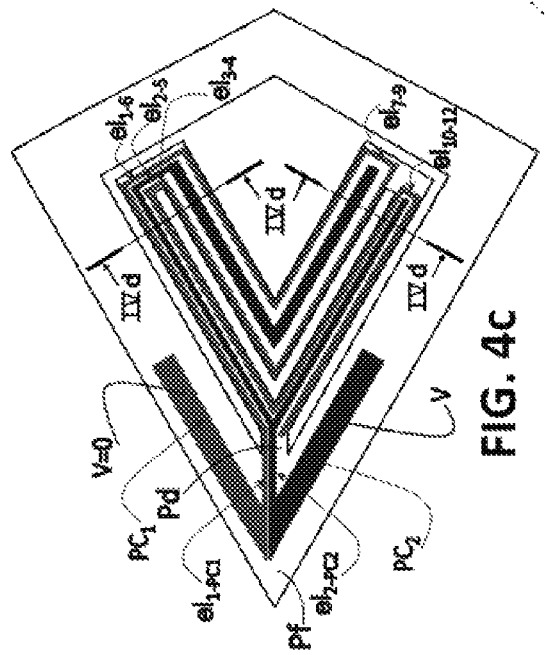
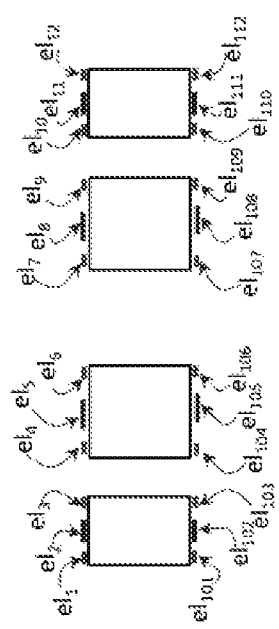
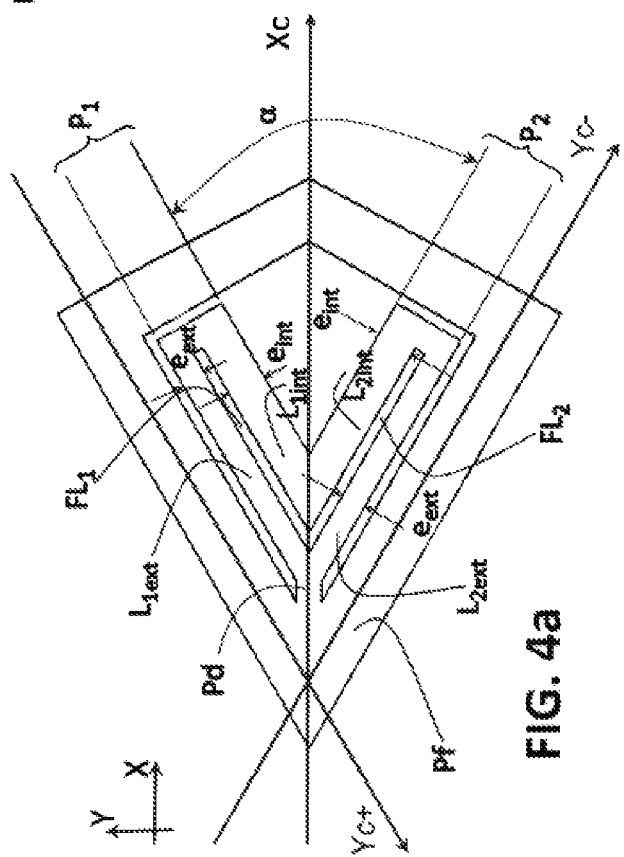

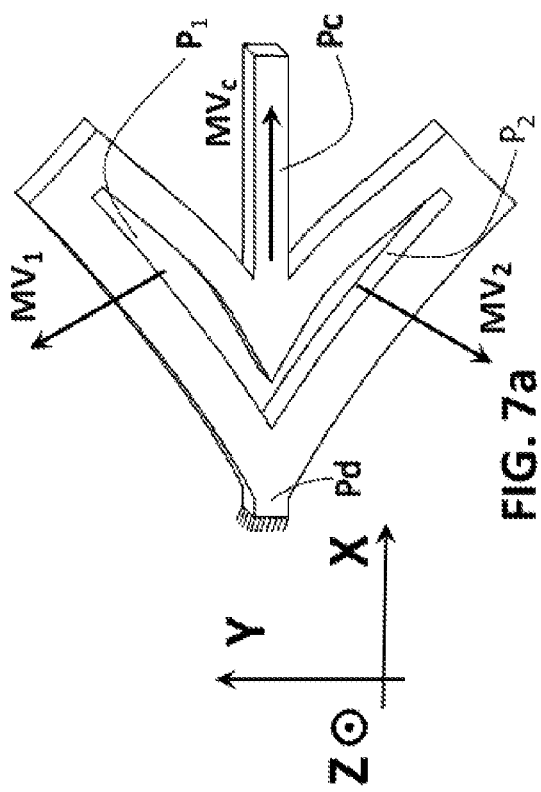
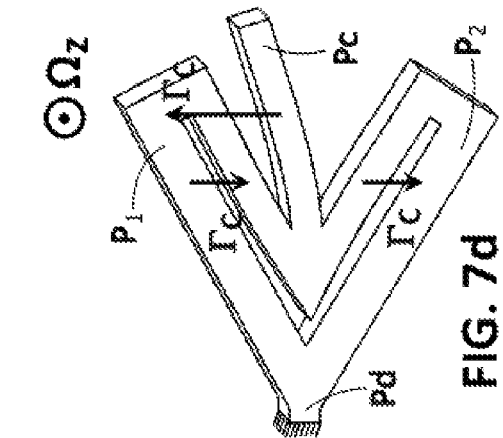
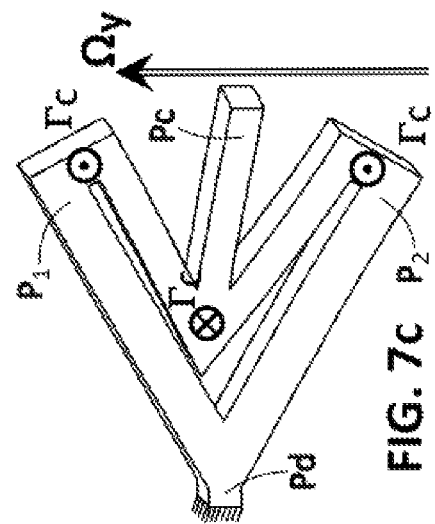
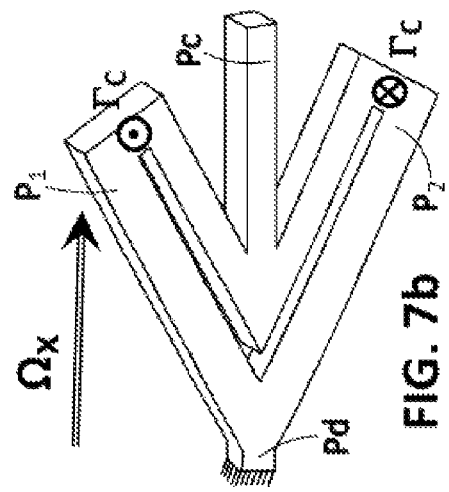
FIG. 7a
FIG. 7b
FIG. 7c
FIG. 7d

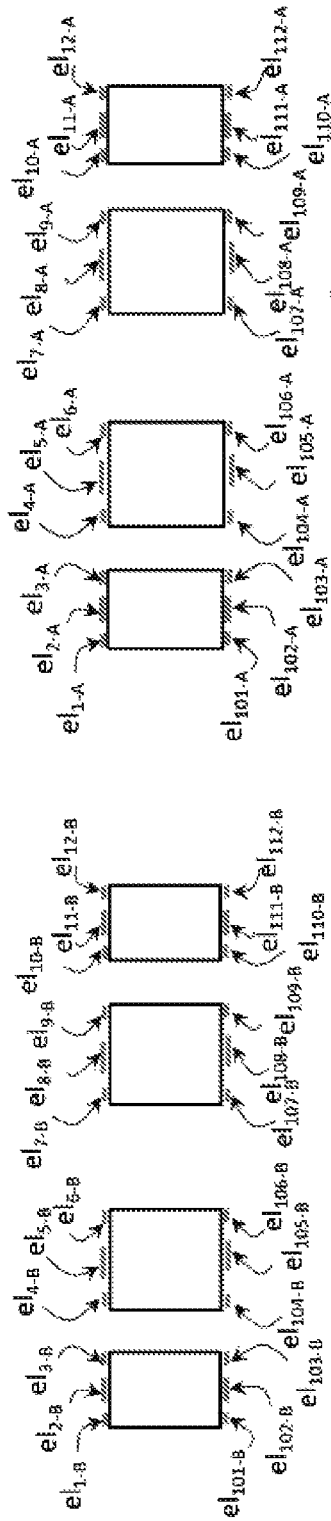
FIG. 9b
FIG. 9c
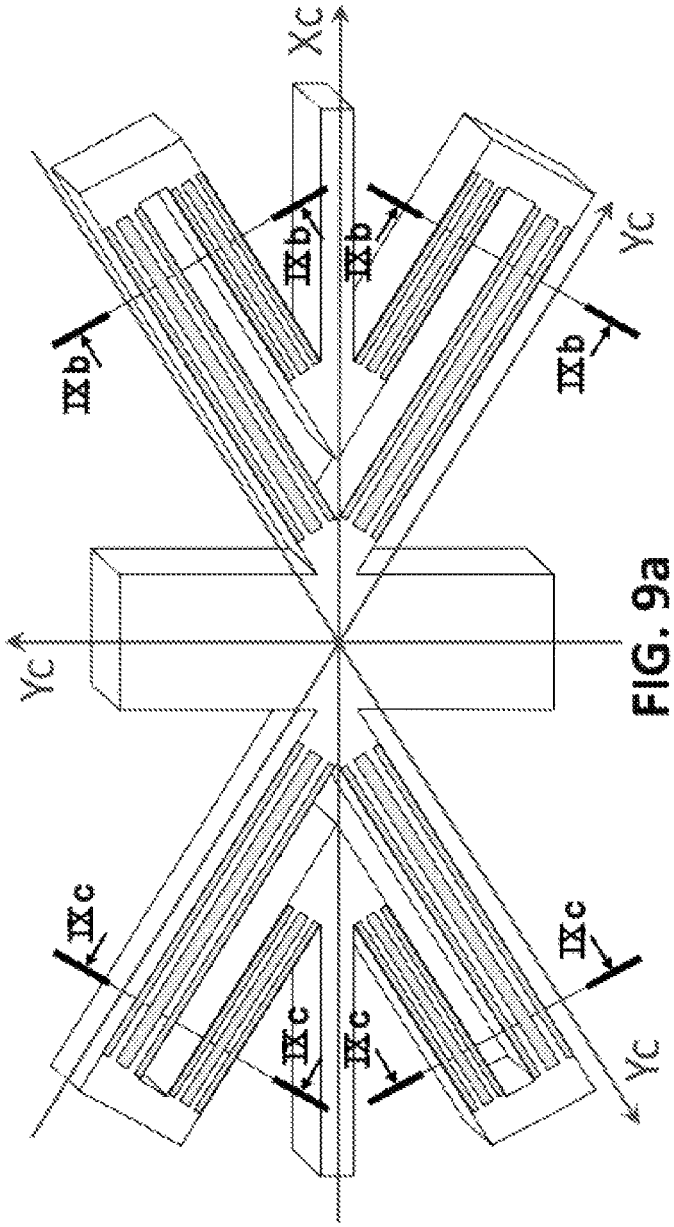
FIG. 9a

HIGH-QUALITY-FACTOR FLEXURAL-VIBRATION RESONATOR FOR PRODUCING TIME REFERENCES FORCE SENSORS OR GYROMETERS

CROSS-REFERENCE TO RELATED APPLICATIONS

This application is the US national stage of PCT/FR2022/050381, filed Mar. 3, 2022 and designating the United States, which claims the priority of FR 2102248, filed Mar. 10, 2021. The entire contents of each foregoing application are incorporated herein by reference.

TECHNICAL FIELD

This description concerns a resonator with a vibrating portion which is formed in a wafer with parallel faces, as well as a force sensor and a gyrometer which comprise such a resonator.

PRIOR ART

Flexural-vibration resonators are widely used for creating time references, gyrometers, and force sensors. The best known examples are the quartz crystal tuning fork for providing a time reference, as described for example in U.S. Pat. No. 3,683,213, the double-ended tuning fork for forming a force sensor, as described for example in U.S. Pat. No. 4,215,570, the double-ended tuning fork for measuring a rotational speed, as described for example in U.S. Pat. No. 61/529,400, or, again for measuring a rotational speed, the simple tuning fork with a decoupling structure as described for example in U.S. Pat. No. 6,414,416.

In the case of piezoelectric flexural-vibration resonators made of quartz crystal, the orientation of the resonator's beam(s) is generally chosen along crystallographic axis Yc, and the planar structure of the resonator is parallel to crystallographic plane Xc-Yc. On the one hand, this allows optimally benefitting from piezoelectric coupling in order to excite and detect flexural vibrations in planes Xc-Yc and Yc-Zc, and on the other hand to benefit from the higher etching speed along axis Zc for etching the structure using an acid type of wet etching process, usually with a mixture of ammonium fluoride ($NH_4F$) and hydrofluoric acid (HF). Indeed, the piezoelectric tensor of trigonal class crystals offers optimal coupling for deformation Syy, i.e. along the axis of the beam, with an electrical field Exx. For this, the flexural vibration of the beam is excited by a direct piezoelectric effect using electrodes which are located along the beam in order to generate the electrical field Exx, and to detect deformations Syy via electrical charges generated by an indirect piezoelectric effect on these same electrodes. Several alternative configurations are possible for the electrodes. For example, the electrodes can be arranged on both sides of the wafer in which the resonator is formed, as shown in [FIG. 1a] for vibrational motions that are parallel to direction Xc, or as shown in [FIG. 1b] for out-of-plane vibrational motions that are parallel to direction Zc. [FIG. 1a] and [FIG. 1b] further show, for each electrode configuration represented, the electrical field component Exx which is necessary for producing bending in the beam. Such configurations, with electrodes on the faces of the wafer, are simple to achieve. But other electrode configurations are also possible, for example with the electrodes arranged on the sides of the beams which are perpendicular to the faces of the wafer. Such other configurations are more effective in generating the bending of the beams, but are more difficult to achieve, as described for example in U.S. Pat. No. 4,524,619.

When these resonators are produced by wet chemical etching of a wafer with parallel faces, etching facets which are due to the crystalline orientation of the etched planes generate asymmetries in the pattern of the resonator, which alter its subsequent operation. Indeed, in the case of crystals of class 32 trigonal symmetry such as quartz, it is known that a beam of orientation Yc which is chemically etched using a mixture of $NH_4F$—HF has a perfectly orthogonal side in direction Xc− and a dihedral on the orthogonal side in direction Xc+−. Then, due to the trigonal symmetry of quartz, this pattern repeats itself every 120° (degrees), as shown in [FIG. 2a]. [FIG. 2b] shows a typical result which is thus obtained for a quartz tuning fork in which the wafer faces are parallel to plane Xc-Yc and the beams are oriented longitudinally along axis Yc. The facets fd on the sides of the beams of the tuning fork break the symmetry relative to the plane P which is orthogonal to the faces of the wafer, and the facets fo at the embedded ends of the beams break the symmetry relative to the midplane M of the resonator.

These breaks in symmetry cause poor dynamic balancing of the resonator, which generates losses of vibrational energy in the resonator's attachment, and consequently degrades its quality factor and the stability of its vibration frequency. These degradations are detrimental to the use of the resonator for producing precision force sensors or time bases.

When such resonators are used to produce vibrating gyrometers, the breaks in symmetry of the resonator generally generate a parasitic mechanical coupling between two useful modes of vibration of the gyrometer. This results in measurement bias, i.e. the output signal from the gyrometer is no longer zero when there is no rotation. The existence of such non-zero measurement bias then greatly degrades the precision of the gyrometer's measurements.

Means of compensation are then applied, generally by adding mass at the ends of the beams and adjusting them by laser ablation, in order to reduce imbalances and/or to adjust the vibration frequency as described in U.S. Pat. No. 3,683,213, or in order to reduce quadrature coupling in the case of the vibrating gyrometers described in U.S. 61/529,400.

Quadrature coupling in gyrometers arises from a mechanical coupling that connects two useful modes of gyrometer vibration: the mode referred to as "pilot mode" which generally corresponds to the tuning fork mode of vibration, and the out-of-plane mode of vibration referred to as "sensing mode" which is excited by the Coriolis acceleration from pilot mode when the resonator is rotated about the longitudinal direction of the beams. In the presence of a break in symmetry of the resonator, mainly the break in symmetry relative to the midplane M (see [FIG. 2b]), coupling stiffness appears between the pilot and sensing modes, which generates a parasitic movement of the resonator in sensing mode in the absence of rotation. Such a defect greatly limits gyrometer performance by introducing measurement bias. However, implementing localized and individually adjusted laser ablations for each manufactured resonator, in order to correct such symmetry defects in gyrometers, is particularly costly and often imperfect, so that the ultimate performance of the gyrometers remains limited.

Other ingenious means for intrinsically reducing quadrature coupling in vibrating quartz gyrometers have been implemented, for example as in FR 2,944,102 filed by the Applicant. In FR 2,944,102, the orientation of the vibrating beams is changed and a torsional mode of vibration of the beams is used, which is coupled by Coriolis accelerations to a flexural mode of vibration. These changes make it possible to obtain perfect symmetry of the vibrating structure even though the resonator is still made using the low-cost process of chemically etching the quartz. Quadrature coupling was reduced in this manner by 3 to 4 orders of magnitude, as reported by Guérard et al. in the article entitled "Quartz structures for Coriolis Vibrating Gyroscopes", DOI: 10.1109/ISISS. 2014.6782534, but to the detriment of the intrinsic thermal sensitivity of the gyrometer, which is greatly degraded because of the significant thermal dependency of the torsional mode, due to the intrinsic properties of quartz.

JP 2005-068690 proposes an original structure for a vibrating quartz gyrometer, in which the sensitive axis is perpendicular to the plane of the structure, taking advantage of the trigonal symmetry of quartz and using three beams which are oriented according to crystallographic axes Yc. In this manner, the obtained gyrometer benefits from very good piezoelectric coupling between the pilot and sensing modes. However, such a vibrating structure is not symmetrical relative to the plane orthogonal to that of the wafer when it is etched by chemical etching, and the vibration modes involved do not allow obtaining good dynamic balancing of the resonator. The quality factors of the useful modes of vibration are then degraded.

For force sensors, the double-ended tuning fork structure which is described in U.S. Pat. No. 4,215,570 constitutes an interesting compromise, in particular due to the very thin slot which separates the two beams intended to vibrate in phase opposition. This configuration ensures good coupling between the resonators while reducing deformation of the embedded ends of the beams. In this manner, parasitic longitudinal movement which occurs when the beams vibrate, and which causes a dissipation of energy, is reduced. This longitudinal movement is exploited for example in musical tuning forks, to transmit the vibrations of the beams to a resonant support through the foot of the tuning fork, in order to emit an audible sound which is very useful for tuning musical instruments. This example of exploiting the longitudinal movement transmitted through the foot of the tuning fork clearly shows the energy leakage which occurs from the resonator to the exterior, through its foot. On the other hand, the double-ended tuning fork of U.S. Pat. No. 4,215,570, when produced by chemical etching, is not symmetrical relative to a plane orthogonal to that of the resonator, because of the dihedral which is present on the orthogonal side in the Xc+ direction. This geometric asymmetry also generates asymmetry in the transmission of longitudinal forces in the two beams, making the frequency variations of the two component beams of the tuning fork unequal. This can then ruin the tuning fork effect, and greatly reduce the value of the quality factor that is in effect when the resonator is subjected to an axial tensile force to be measured. Alternatives to the double-ended tuning fork have been proposed for producing force sensors, such as the one described in FR 8,418,587 filed by the Applicant. In effect, FR 8,418,587 proposes associating a simple single-beam resonator which is intended to vibrate flexurally with systems for decoupling the vibrations of this beam from the support, via inertial masses provided at the ends of the beam. This resonator has two advantages: on the one hand, a single beam (tine) instead of two for the tuning fork makes it possible to double the scale factor of the resonator, meaning the variation in frequency as a function of the axial tensile force to be measured; and on the other hand the principle of decoupling, which provides high tolerance for the alignment errors which may exist. However, such a resonator remains bulky, which can limit its use in miniature devices such as accelerometers based on a resonator used as a sensor element, and on the frequency variation associated with the force generated by a test mass via the acceleration to be measured. Another original alternative has been proposed in FR 2739,190, also filed by the Applicant, integrating a simple flexural-vibration resonator within a monolithic accelerometer structure and providing at the monolithic accelerometer structure a system of decoupling vibrations to the outside. Optimization of the simple flexural-vibration resonator has also been proposed in FR 2,805,344, again filed by the Applicant, by improving the value of the figure of merit F×Q/Sf, where F is the frequency of the resonator, Q is the resonance quality factor, and Sf is the scale factor expressed in Hertz per m/s$^2$. This improvement is obtained by using a beam of non-constant cross-section which provides a gain by a factor of 1.2 on the figure of merit F×Q/Sf, representative of the stability of the accelerometer bias, i.e. the stability of the resonator frequency in the absence of acceleration. However, these simple resonators are not satisfactory for variable-frequency force sensor applications which require that the resonator be intrinsically decoupled and not sensitive to its attachment conditions in order to allow easy and reliable force measurement. Based on this, one aspect of the present invention is to propose a new force sensor which satisfies these intrinsic decoupling requirements, but which is no longer based on modification of the stiffness of the flexural-vibration beam, as produced by the axial force acting as a restoring torque and thus modifying the resonance frequency, but modifies the flexural inertia generated by the displacement produced by the force applied to the resonator. This force sensor principle based on modifying the flexural inertia has already been proposed, for example in the article "New resonant accelerometer based on rigidity change", Y. Omura, Y. Nonomura, O. Tabata, TRANSDUCERS 97, 1997, International Conf. Solid-State Sensors and Actuators, Chicago, although based on a non-decoupled resonator, which cannot satisfy demanding applications where a resonator of high quality factor is needed for measurement accuracy and resolution.

It is important to recall at this stage that wet chemical etching to produce crystalline vibrating devices is an inexpensive process particularly suitable for the collective production of microdevices, while preserving the intrinsic quality factors of crystal. Indeed, chemical etching, being based on a local chemical reaction, allows dissolving crystal atom by atom without altering or degrading the crystal lattice of the material. This is not the case for etching based on local abrasion, such as ultrasonic machining which uses fine abrasive particles excited by ultrasonic waves generated between a probe (sonotrode) and the surface to be etched, or based on ion bombardment which uses the kinetic energy of ions. These last two techniques alter the crystal lattice at the edges of the etching, over characteristic distances of a few tens of nanometers to a few micrometers for the higher-energy etchings, which reduces the intrinsic quality factor of the resonators, all the more so when miniaturization of the device is desired.

TECHNICAL PROBLEM

Based on this situation, one object of the present invention is to provide a new resonator which is improved concerning at least some of the disadvantages of prior resonators, as discussed above.

In particular, one object of the invention is to provide a resonator for which the losses of vibrational energy to the outside are reduced, in order to provide an increased value for the quality factor.

An ancillary object of the invention is to reduce the symmetry defects which can affect the shape of the resonator, resulting from differences in etching speed that exist between different crystalline orientations of a material used to construct the resonator.

SUMMARY OF THE INVENTION

To achieve at least one of these or other objects, a first aspect of the invention proposes a resonator which comprises:

a portion of a wafer having two opposite faces which are flat and parallel, the wafer portion being intended to vibrate flexurally during use of the resonator, and referred to as the vibrating portion; and a support part, which is external to the vibrating portion and connected thereto by an intermediate segment of the wafer referred to as a foot, the foot being integral with the vibrating portion and forming a rigid connection between the support part and the vibrating portion.

In this resonator of the invention, the vibrating portion has a first plane of symmetry, referred to as the midplane, which is parallel to both faces of the wafer and equidistant from these two faces, and a second plane of symmetry, referred to as the plane of symmetry orthogonal to the wafer, which is perpendicular to the midplane and which passes longitudinally through the connection formed by the foot between the support part and the vibrating portion. The intersection between the midplane and the plane of symmetry orthogonal to the wafer constitutes a center axis of the vibrating portion. The vibrating portion comprises two extensions which are each intended to vibrate flexurally, these two extensions extending symmetrically from the foot on each side of the plane of symmetry orthogonal to the wafer.

According to some features of the invention, each extension is provided with a longitudinal slot which passes through the vibrating portion perpendicularly to the midplane, from the plane of symmetry orthogonal to the wafer towards a distal end of this extension but without reaching that distal end, so that each extension is meander shaped. The respective slots of the two extensions are symmetrical relative to the plane of symmetry orthogonal to the wafer, and meet at this plane of symmetry orthogonal to the wafer. The vibrating portion thus comprises two primary segments which each connect the foot to the distal end of one of the extensions, and two secondary segments which are interconnected at the plane of symmetry orthogonal to the wafer by respective proximal ends of these secondary segments, and which each extend to the distal end of one of the extensions so as to connect to one of the primary segments at this distal end.

Thanks to such a configuration of the vibrating portion, and for a mode of vibration of the vibrating portion which comprises only movements parallel to the midplane, and which is symmetrical relative to the plane of symmetry orthogonal to the wafer, the two primary segments have instantaneous velocity components, parallel to the center axis, which, at each instant during the vibration, are in the opposite direction to that of the instantaneous velocity components of the secondary segments, also parallel to the center axis. These opposing velocity orientations allow some of the momentum components associated with them to compensate for each other at least partially, so that movements transmitted to the foot by the vibrating portion are reduced. As a result, the resonator has low vibrational energy losses, so its quality factor can be high.

Advantageously, the vibrating portion may have a distribution of mass such that the mode of vibration which only comprises movements parallel to the midplane and which is symmetrical relative to the plane of symmetry orthogonal to the wafer, does not cause movement of the foot in parallel to the center axis. In other words, compensation for the momentum components of the vibrating portion which are parallel to the center axis of the resonator can be exact or near-exact. In this case, the vibrational energy losses through the foot of the resonator are zero or almost zero, and the quality factor can be very high.

In preferred embodiments of the invention, the material of the wafer may be monocrystalline and of trigonal class and piezoelectric. In this case, the center axis of the vibrating portion is parallel to an axis Xc of the material, and both primary segments as well as both secondary segments of the vibrating portion are parallel to axes Yc of the material. In other words, one of the two extensions of the vibrating portion may be parallel to crystallographic axis Yc+ and the other parallel to crystallographic axis Yc−. For such embodiments, the two extensions of the vibrating portion may form an angle between them which is equal to 60°. In particular, the wafer may be made of α-quartz crystal (α-$SiO_2$) or any other crystal of the trigonal system of symmetry class 32, such as gallium orthophosphate ($GaPO_4$), germanium oxide ($GeO_2$), gallium arsenate ($GaAsO_4$), or the crystals of the LGX family: langasite (LGS or $La_3Ga_5SiO_{14}$), langatate (LGT or $La_3Ga_5,5TaO,5O_{14}$), or langanite (LGS or $La_3Ga_5,5NbO,5O_{14}$).

Alternatively, both extensions of the vibrating portion can form an angle between them which is equal to 180°.

When the material of the wafer is monocrystalline and of trigonal class and piezoelectric, the resonator of the invention may further comprise:

excitation means, adapted for generating flexural deformations of the vibrating portion, these excitation means comprising first and second electrodes which are electrically insulated from each other, the first electrode comprising, on each face of the wafer and for each primary or secondary segment, a strip of electrically conducting material which is arranged longitudinally on this segment, centrally within a width of the segment, and the second electrode comprising, also on each face of the wafer and for each primary or secondary segment, two strips on this segment which are arranged on two opposite sides of the strip of the first electrode; and detection means, adapted for measuring an amplitude of the flexural deformations of the vibrating portion which are generated by the excitation means during use of the resonator, these detection means comprising a circuit for detecting an electrical current which appears in the first and second electrodes.

In general for the invention, each extension of the vibrating portion may comprise, at its distal end and parallel to the midplane, a widening relative to the outer longitudinal edges of the primary and secondary segments of this extension. Such widening provides an additional degree of freedom in order to provide compensation for the momentum components of the vibrating portion that are parallel to the center axis. The design of a resonator in accordance with the invention, and having a high quality factor, is thus facilitated.

Also in general for the invention, the resonator may further comprise an additional portion of the wafer, in the form of a segment and referred to as a stem, which extends from the interconnected proximal ends of the secondary segments, parallel to the center axis and in a direction away from the foot. This stem can also contribute to obtaining compensation for the momentum components of the vibrating portion which are parallel to the center axis.

The resonator may possibly comprise two vibrating portions formed in the same wafer and provided with respective stems. Both vibrating portions can then be interconnected by their stems, oriented opposite to each other so that the respective center axes of both vibrating portions are superimposed.

According to another possibility, the resonator may also comprise two vibrating portions formed in the same wafer, interconnected by the respective feet of these two vibrating portions, and oriented opposite to each other so that the respective center axes of the two vibrating portions are again superimposed.

A second aspect of the invention proposes a force sensor which comprises a resonator in accordance with the invention, with two vibrating portions interconnected by their respective stems. Such a sensor is adapted for measuring a tensile force which is applied between the respective feet of both vibrating portions and which is parallel to the center axes of the two vibrating portions.

Lastly, a third aspect of the invention relates to a gyrometer which comprises at least one resonator in accordance with the first aspect of the invention. The operation of such a gyrometer uses the coupling produced by the Coriolis accelerations between the mode of vibration with movements parallel to the midplane and a mode of vibration in which the movements are perpendicular to this midplane.

Preferably, the gyrometer may comprise a resonator with two vibrating portions which are interconnected by their respective feet while being oriented in opposite directions. For such configuration of the gyrometer, two distinct uses are possible, each with a single responsive axis of rotation, depending on the pilot mode chosen. According to a first possible choice for the pilot mode, in this pilot mode both vibrating portions vibrate in phase opposition. The Coriolis accelerations generated by rotation about an axis parallel to the common center axis of both vibrating portions then excite an out-of-plane mode of vibration which is dynamically balanced. According to another choice which is also possible, this time in the pilot mode the two vibrating portions vibrate in phase, and the Coriolis accelerations generated by rotation about an axis which is perpendicular to the common center axis of both vibrating portions and which is parallel to the midplane, excite another out-of-plane mode of vibration which is also dynamically balanced. In a preferred embodiment of such a gyrometer with two vibrating portions which are connected by their respective feet while being oriented opposite to each other, the wafer may be made of quartz crystal and each of the two vibrating portions has its extensions positioned at 60° relative to each other and parallel to crystallographic axes Yc. Such a configuration makes it possible to obtain an optimal piezoelectric coupling for the modes of vibration to be excited or detected, as well as a symmetrical production of the resonator when it is manufactured by chemical etching.

BRIEF DESCRIPTION OF FIGURES

The features and advantages of the invention will become more clearly apparent from the following detailed description of some non-limiting embodiments, with reference to the appended figures which include:

FIG. 3a shows the momentum involved for a tuning fork with parallel beams as known from the prior art;

FIG. 3b corresponds to FIG. 3a for a tuning fork with non-parallel beams;

FIG. 3c corresponds to FIG. 3b for a double-ended tuning fork with non-parallel tines, which allows globally compensating for imbalanced momentums within each tuning fork;

FIG. 4a is a plan view of a first resonator made of trigonal piezoelectric material, which is in accordance with the invention;

FIG. 4b corresponds to FIG. 4a, showing deformations of the useful mode of vibration of the first resonator, and of the associated momentums;

FIG. 4c corresponds to FIG. 4a, showing its electrodes which allow exciting and detecting the vibration of the useful mode, in the case of a resonator made of trigonal piezoelectric crystal of symmetry class 32, such as quartz;

FIG. 4d is a section view of the first resonator, corresponding to FIG. 4c;

FIG. 7a is a perspective view of a first gyrometer in accordance with the invention, and shows deformations which are associated with a pilot mode of this first gyrometer;

FIG. 7b corresponds to FIG. 7a but shows deformations generated from the pilot mode of FIG. 7a by rotation around a first axis;

FIG. 7c corresponds to FIG. 7b for a second axis of rotation;

FIG. 7d corresponds to FIG. 7b for a third axis of rotation;

FIG. 9a is a perspective view of the second gyrometer, showing its electrodes;

FIG. 9b is a first section view of the second gyrometer, corresponding to FIG. 9a;

FIG. 9c is a second section view of the second gyrometer, also corresponding to FIG. 9a;

DETAILED DESCRIPTION OF THE INVENTION

Figure 1A:
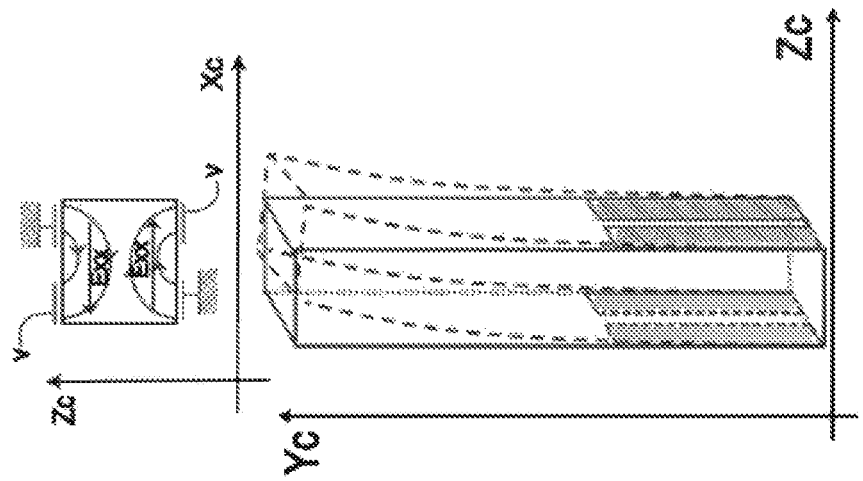
FIG. 1a, already discussed, is a reminder of a first possible electrode configuration suitable for piezoelectric coupling which can be used for the excitation and detection of flexural vibrations of a beam within the plane, in the case of a beam material which is piezoelectric and belonging to the trigonal system of symmetry class 32, such as α-quartz.
Figure 1B:
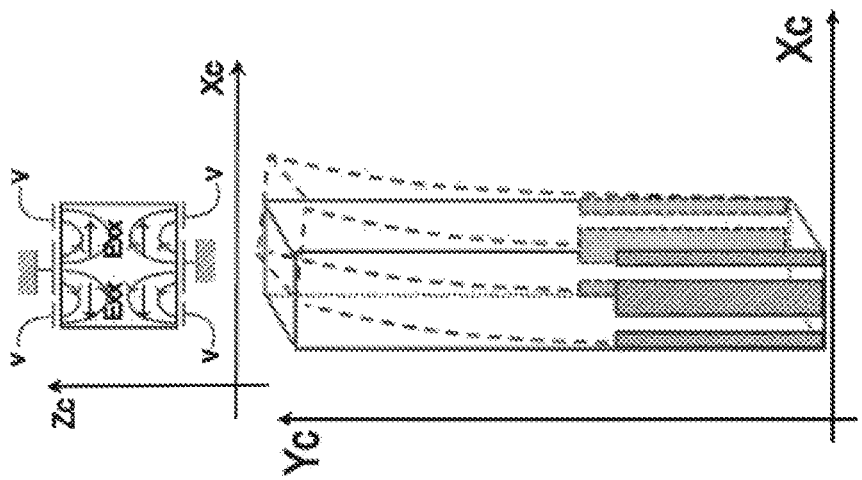
FIG. 1b, already discussed, corresponds to FIG. 1a for a second possible electrode configuration that can be used for the excitation and detection of out-of-plane vibrations.
Figure 2B:
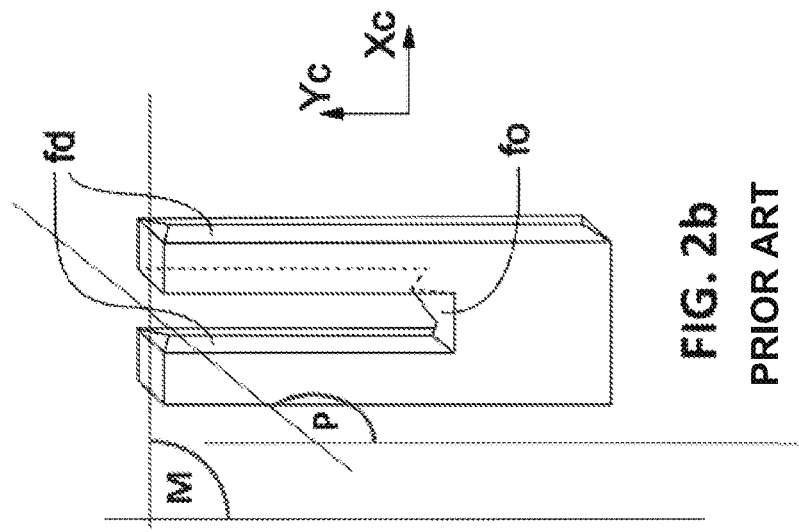
FIG. 2b, already discussed, shows a resonator in the form of a tuning fork as known from the prior art and obtained by chemically etching a quartz crystal, using a mixture of ammonium fluoride and hydrofluoric acid, with the breaks in symmetry that result when the two beams (tines) of the tuning fork are parallel to the Y axis.
Figure 2A:
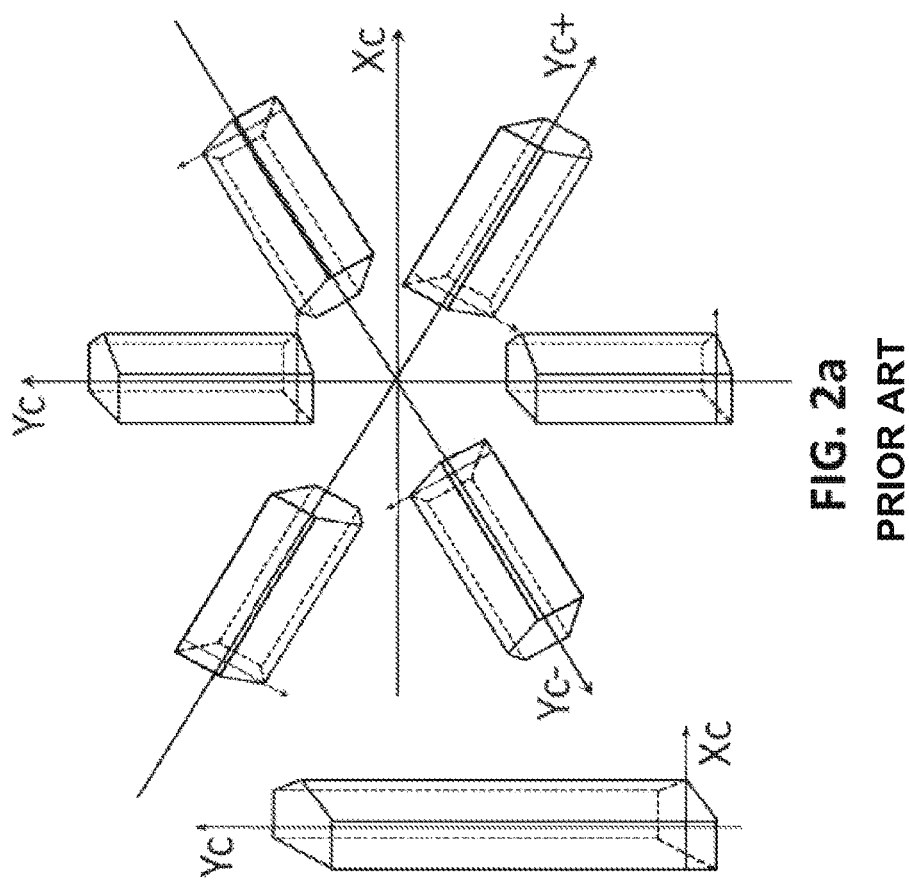
FIG. 2a, already discussed, is a reminder of trigonal symmetry.

For clarity sake, the dimensions of the elements shown in these figures correspond neither to actual dimensions nor to actual dimensional ratios. In particular, all the resonator deformations which are represented are enlarged to an exaggerated extent for better visibility. Furthermore, identical references indicated in different figures designate elements or measurements which are identical or which have identical functions.

A first resonator according to the invention is now described with reference to [FIG. 4a]-[FIG. 4d]. This first resonator comprises a support part or fixed part, designated by the reference Pf, a vibrating portion, and a foot Pd which connects the vibrating portion to the fixed part Pf. Preferably, the fixed part Pf, the vibrating portion, and the foot Pd are formed simultaneously by chemical etching in a wafer having parallel faces, such that the material of these three resonator portions is continuous. The wafer used can have a thickness of between several micrometers and several millimeters, when this thickness is measured perpendicularly to its faces. The vibrating portion of the resonator of [FIG. 4a]-[FIG. 4d] comprises two extensions $P_1$ and $P_2$ which extend from the foot Pd and which between them form a non-zero angle $\alpha$. The two extensions $P_1$ and $P_2$ extend symmetrically to either side of a center axis which is coincident with the longitudinal direction of the foot Pd. This center axis corresponds to the intersection between a first plane of symmetry which is parallel to the faces of the wafer and located at the mid-thickness thereof, and a second plane of symmetry which is orthogonal to the faces of the wafer and in which the two extensions $P_1$ and $P_2$ correspond via reflective symmetry. In the remainder of this description, and by analogy with a tuning fork resonator as described in U.S. Pat. No. 3,683,213, the two extensions $P_1$ and $P_2$ are also called beams $P_1$ and $P_2$. According to the invention, a longitudinal slot is provided in each beam $P_1$, $P_2$, and respectively designated by the reference $FL_1$, $FL_2$. These two longitudinal slots $FL_1$ and $FL_2$ meet at the center axis of the resonator. Each beam $P_i$, the index i being equal to 1 or 2, is thus composed of two blades $L_{iext}$ and $L_{iint}$. In the general part of this description, blade $L_{1ext}$ (respectively $L_{2ext}$) was referred to as the primary segment of extension $P_1$ (resp. $P_2$), and blade $L_{1int}$ (respectively $L_{2int}$) was referred to as the secondary segment of extension $P_1$ (rasp. $P_2$). Thus, the two blades $L_{1ext}$ and $L_{2ext}$ are connected to the foot Pd, and extend to the respective distal ends of extensions $P_1$ and $P_2$, where they are connected one-on-one to the two blades $L_{1int}$ and $L_{2int}$. Each extension $P_1$, $P_2$ thus is meander shaped between the center axis and its distal end. In addition, blades $L_{1int}$ and $L_{2int}$ are interconnected at the center axis by respective proximal ends of these two blades $L_{1int}$ and $L_{2int}$. The two longitudinal slots $FL_1$ and $FL_2$ of the respective beams $P_1$ and $P_2$ also meet at the center axis, such that the joining of the respective proximal ends of the two blades $L_{1int}$ and $L_{2int}$ is separated from blades $L_{1ext}$ and $L_{2ext}$ and from the foot Pd. As is shown in [FIG. 4b], when, during vibration of the resonator, the distal ends of beams $P_1$ and $P_2$ symmetrically move away from the center axis in opposite directions, blades $L_{1ext}$ and $L_{2ext}$ have respective momentums $MV_1$ and $MV_2$ which are oriented towards the same side of the resonator as the foot Pd, obliquely but symmetrically, and the joint connection of blades $L_{1int}$ and $L_{2int}$ has a momentum $MV_{12}$ which is parallel to the center axis while being oriented away from the foot Pd. As a result, blades $L_{1int}$ and $L_{2int}$ have respective momentums which are oriented, obliquely but symmetrically, towards the side of the resonator which is opposite to the foot Pd. Then, according to an optimization proposed by the invention, a distribution of mass in the vibrating portion, between all the blades $L_{1ext}$, $L_{2ext}$, $L_{1int}$ and $L_{2int}$, can be done such that movement of the foot Pd resulting from these momentums is zero or almost zero. Due to this lack of movement of the foot Pd, the transmission of vibrational energy from the vibrating portion to the support part Pf is zero or very low, so the quality factor of the resonator can be high. The optimized distribution of mass between the four blades of the vibrating portion is still symmetrical relative to the center axis, and can be obtained by assigning a common thickness $e_{ext}$ to the two blades $L_{1ext}$ and $L_{2ext}$ which is different from that of the two blades $L_{1int}$ and $L_{2int}$, denoted $e_{int}$. When such optimization is applied, the resonator is said to be balanced. The blade thicknesses $e_{ext}$ and $e_{int}$ are measured parallel to the faces of the wafer.

Figure 5B:
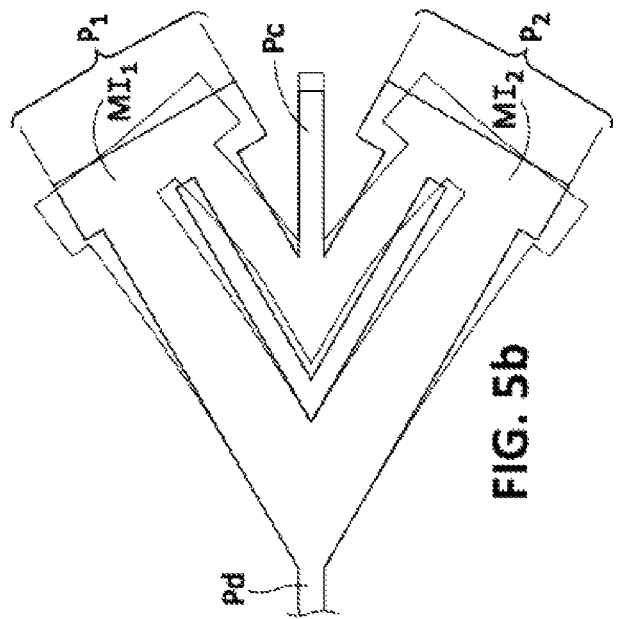
FIG. 5b corresponds to FIG. 5a, showing deformations of the useful mode of vibration.
Figure 5A:
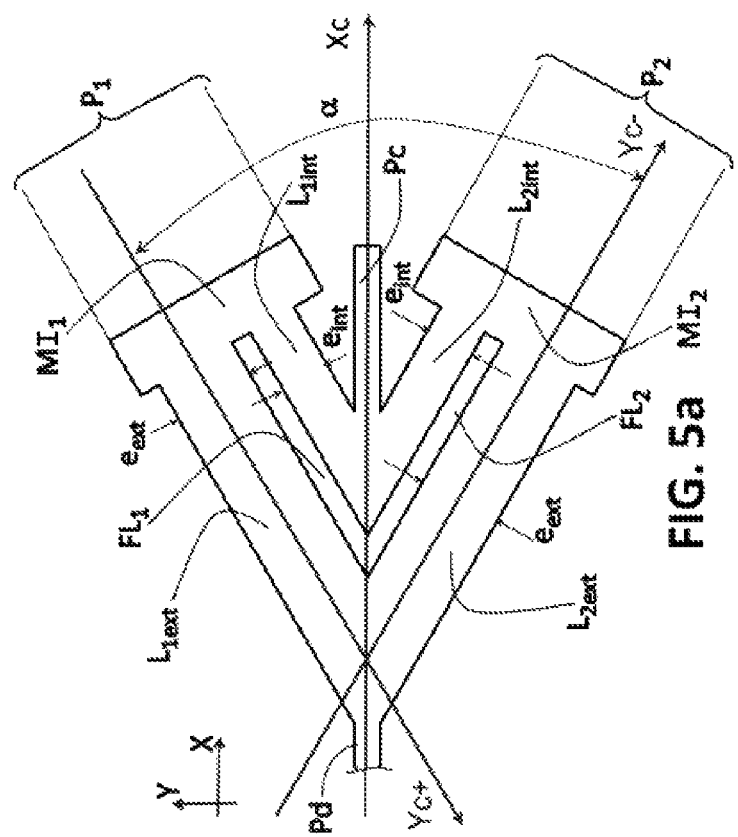
FIG. 5a corresponds to FIG. 4a when two possible improvements of the invention are used.

According to two improvements of the invention which are shown together in [FIG. 5a] but which can be used independently of each other, the vibrating portion of the resonator can be supplemented by two inertial masses $MI_1$ and $MI_2$ for the first improvement, and by a stem Pc for the second improvement. Preferably, the two inertial masses $MI_1$ and $MI_2$ are located at the distal ends of the two beams $P_1$ and $P_2$, and are identical. They can each be formed by widening the corresponding beam $P_1$, $P_2$ at its distal end. The stem Pc can be formed by an additional blade which extends from the joining of the proximal ends of blades $L_{1int}$ and $L_{2int}$, parallel to the center axis and superimposed thereon, in a direction away from the foot Pd. Advantageously, the stem Pc is also symmetrical relative to the center axis. The addition of the two inertial masses $MI_1$ and $MI_2$, and/or of the stem Pc, to the vibrating portion of the resonator makes it possible to obtain balance of the resonator with additional degrees of freedom. [FIG. 5b] shows the movements of the inertial masses $MI_1$ and $MI_2$ as well as that of the stem Pc at the same instant during vibration of the resonator. The two inertial masses $MI_1$ and $MI_2$ then have momentum components along the center axis which are opposite to that of the stem Pc. These momentum components of the inertial masses $MI_1$ and $MI_2$ and of the stem Pc combine with those of the four blades $L_{1ext}$, $L_{2ext}$, $L_{1int}$ and $L_{2int}$ to produce a movement of the foot Pd which is zero or substantially zero, by applying the invention.

It should be noted that such resonator balance is naturally obtained for a tuning fork with parallel beams as known from the prior art and represented in [FIG. 3a], since the two beams $P_1$ and $P_2$ are identical. The momentums of the two beams $P_1$ and $P_2$ are again respectively denoted $MV_1$ and $MV_2$. Such a resonator in accordance with [FIG. 3a] does not cause movement of its foot Pd in parallel to its center axis X during its vibrations, because the momentums $MV_1$ and $MV_2$ are perpendicular to this center axis. Moreover, for the mode of vibration where the two beams $P_1$ and $P_2$ move in phase opposition, the momentums $MV_1$ and $MV_2$ of the two beams compensate if both beams $P_1$ and $P_2$ are identical. The tuning fork resonator is then balanced. There is therefore no transmission of vibrational energy by the beams $P_1$ and $P_2$ to the foot Pd, ignoring the deformations of this foot at the embedded ends of the two beams $P_1$ and $P_2$, which produce bending moments $Mf_1$ and $Mf_2$ and shear forces $T_1$ and $T_2$, all the more so when the gap separating the two beams $P_1$ and $P_2$ is narrow. However, as mentioned above, such a resonator with parallel and symmetrical beams cannot be produced solely by chemically etching a wafer of trigonal class 32 crystalline material, because of the etching facets which will appear and break the symmetry of shape between the two beams $P_1$ and $P_2$. To obtain two beams which have symmetrical shapes, it is possible to produce the resonator with its two beams $P_1$ and $P_2$ being parallel to axes Yc+ and Yc− of trigonal class 32 crystalline material, and with the center axis of the resonator being parallel to crystallographic axis Xc. But then the two beams $P_1$ and $P_2$ of the tuning fork are no longer parallel, and for this reason it becomes impossible to achieve resonator balance. Thanks to the use of longitudinal slots $FL_1$ and $FL_2$ according to the invention in the resonator of [FIG. 4a]-[FIG. 4d], resonator balance is again possible although its beams $P_1$ and $P_2$ are not parallel to each other.

However, the inventors point out that it is possible to achieve balancing of the resonator of [FIG. 3b] with its non-parallel beams, by making its vibrating portion symmetrical relative to plane Y-Z. The vibrating portion thus comprises four beams $P_1$, $P_2$, $P_3$ and $P_4$ which can have symmetrical shapes such as those resulting from chemical etching of a trigonal class 32 crystalline material. The foot Pd of the resonator is then located where the four beams intersect. In this case, the resonator is balanced for a mode of vibration in which the two tuning forks vibrate in phase. However, the double-ended tuning fork resonator configuration which is thus obtained, as represented in [FIG. 3c], is more bulky and may be poorly suited for applications where significant miniaturization is required. For such applications, the resonator of [FIG. 4a]-[FIG. 4d] or [FIG. 5a]-[FIG. 5b] may be preferred.

For the resonator of [FIG. 4a]-[FIG. 4d] or [FIG. 5a]-[FIG. 5b], the angle α between the two beams $P_1$ and $P_2$ is equal to 60°. In this manner, it is possible to obtain symmetrical implementations by chemically etching a wafer having parallel faces which is made of a trigonal class 32 crystalline material, by longitudinally orienting the beams $P_1$ and $P_2$ to be parallel to crystallographic axes Yc+ and Yc−, and the center axis to be parallel to crystallographic axis Xc, the faces of the wafer being perpendicular to axis Z. For example, the material of the wafer can be monocrystalline α-quartz, which is piezoelectric. In this case, the resonator can be provided with two electrodes as shown in [FIG. 4c] and [FIG. 4d]. In a known manner, these electrodes can be used both as means for exciting the symmetrical vibration mode, and as means for detecting the vibration amplitude in this same mode. The references in these two figures have the meanings listed below:

for the first electrode, which can be connected to an electrical ground:
  $PC_1$ segment of the first electrode which is carried by the support part Pf of the resonator
  $el_{1\text{-}PC1}$ segment of the first electrode which is carried by the foot Pd of the resonator
  $el_1$ segment of the first electrode which is carried by blade $L_{1ext}$ along an outer edge thereof, on a first of the two faces of the wafer
  $el_3$ segment of the first electrode which is carried by blade $L_{1ext}$ along an internal edge thereof, on the first face of the wafer
  $el_4$ segment of the first electrode which is carried by blade $L_{1int}$ along an internal edge thereof, on the first face of the wafer
  $el_6$ segment of the first electrode which is carried by blade $L_{1int}$ along an outer edge thereof, on the first face of the wafer
  $el_7$ and $el_9$ respectively correspond to $el_6$ and $el_4$, for blade $L_{2int}$
  $el_{10}$ and $el_{12}$ respectively correspond to $el_3$ and $el_1$, for blade $L_{2ext}$
  $el_{1\text{-}6}$ electrical connection segment between segments $el_1$ and $el_6$ at the distal end of beam $P_1$, on the first face of the wafer
  $el_{3\text{-}4}$ electrical connection segment between segments $el_3$ and $el_4$ at the distal end of beam $P_1$, on the first face of the wafer
  $el_{7\text{-}9}$ electrical connection segment between segments $el_7$ and $el_9$ at the distal end of beam $P_2$, on the first face of the wafer
  $el_{10\text{-}12}$ electrical connection segment between segments $el_{10}$ and $el_{12}$ at the distal end of beam $P_2$ and on the first face of the wafer.

First electrode segments $el_6$ and $el_7$ are interconnected at the center axis, as are segments $el_4$ and $el_9$, and as are segments $el_3$ and $el_{10}$.

for the second electrode, which can be connected to a source of alternating voltage V:
  $PC_2$ and $el_{2\text{-}PC2}$ respectively correspond to $PC_1$ and $el_{1\text{-}PC1}$, and for the second electrode
  $el_2$ segment of the second electrode which is carried by blade $L_{1ext}$ in a central part thereof, on the first face of the wafer
  $el_5$, $el_8$ and $el_{11}$ correspond to $el_2$ for blades $L_{1int}$, $L_{2int}$ and $L_{2ext}$ respectively
  $el_{2\text{-}5}$ electrical connection segment between segments $el_2$ and $el_5$ at the distal end of beam $P_1$, on the first face of the wafer.

Second electrode segments $el_5$ and $el_8$ are interconnected at the center axis, as are segments $el_2$ and $el_{11}$.

Electrode segments $el_{10n}$, the integer index n varying from 1 to 12, respectively correspond to segments $el_n$ for the second face of the wafer, with electrical connection segments which are similar to those described for the first face of the wafer. Lastly, the segments of a same electrode of the two electrodes which are located on each of the two faces of the wafer are electrically interconnected, either by an electrical connection carried by the resonator, or by an external electrical connection.

Each electrode segment may be composed of a strip of conducting material such as gold (Au), for example deposited using a thin film deposition technique, and have a width equal to 200 µm (micrometers). In accordance with the list just provided, three parallel strips are arranged on each blade face, meaning a total of twelve conducting strips per face of the wafer, $el_1$ to $el_{12}$ on the first face and $el_{101}$ to $el_{112}$ on the second face. As already explained with reference to [FIG. 1a], the three conducting strips on each blade face enable excitation and detection which are effective for flexural vibrations of the blade that are parallel to plane Xc-Yc, when this blade extends longitudinally along crystallographic axis Yc+ or Yc−. For increased efficiency of the piezoelectric coupling, it is advantageous for the strips of the first electrode to be relatively thin, with strip widths that are between $\frac{1}{10}$ and $\frac{1}{5}$ of the thickness $e_{ext}$ or $e_{int}$ of the blades $L_{1ext}$, $L_{2ext}$, $L_{1int}$ and $L_{2int}$. For the strips of the second electrode, their widths can be between two and five times those of the strips of the first electrode.

Such a layout for electrodes for vibration excitation and detection by piezoelectric effect is suitable for the mode of flexural vibration where the two beams $P_1$ and $P_2$ move in phase opposition, as shown in [FIG. 4b]. However, other electrode configurations are alternatively possible, for example by depositing strips of conducting material on the sides of the blades which are perpendicular to the faces of the wafer. In this case, strips $el_1$ and $el_{101}$ are replaced by a single strip on the side of blade $L_{1ext}$, and similarly for the pairs of strips of the first electrode which are separately carried by the other strips $L_{1int}$, $L_{2int}$ and $L_{2ext}$. Each blade side then carries two strips which are each close to the edge of the side that is opposite to that of the other strip, with one of the two strips belonging to the first electrode, and the other strip belonging to the second electrode. This other electrode configuration is more efficient than that of [FIG. 4c]-[FIG. 4d] for piezoelectric coupling, but at the cost of greater complexity in its production.

The resonator can thus be associated with an electronic oscillator loop, which is connected to the input of segments $PC_1$ of the first electrode on the support part Pf of the resonator, and to the output of segments $PC_2$ of the second electrode, also on the support part Pf. The mode of vibration in which the two beams $P_1$ and $P_2$ move in phase opposition is thus excited by the alternating voltage V applied by the electronic oscillator loop between the two electrodes, and the vibration amplitude of the resonator for this same mode is detected by the electrical current generated in the two electrodes by the vibrations of the resonator. For this purpose, a current detection circuit can be used in the electronic oscillator loop, which advantageously has a high input impedance.

The inventors now provide some rules which allow balancing, according to the invention, of a resonator in accordance with [FIG. 4a]-[FIG. 4d], i.e. without the inertial masses $MI_1$, $MI_2$ or the stem Pc. The resonator frequency F for the mode of flexural vibration, where the two beams $P_1$ and $P_2$ move symmetrically in phase opposition, can be approximated using the following equation (equation 1):

$$F(\text{in Hertz}) \cong 0.58 \cdot \frac{\frac{e_{int}}{L_{int}^2} \cdot \frac{e_{ext}}{L_{ext}^2}}{\frac{e_{int}^2}{L_{int}^4} + \frac{e_{ext}^2}{L_{ext}^4}} \cdot \frac{e_{int} \cdot \sqrt{\frac{e_{int} + F_l}{e_{ext} + F_l}}}{L_{int} \cdot L_{ext}} \cdot \sqrt{\frac{E}{\rho}}$$

with the following meanings, some of which have already been provided:

$e_{int}$: common thickness of blades $L_{1int}$ and $L_{2int}$, measured parallel to the faces of the wafer and expressed in meters $e_{ext}$: common thickness of blades $L_{1ext}$ and $L_{2ext}$, measured parallel to the faces of the wafer and expressed in meters $L_{int}$: common length of blades $L_{1int}$ and $L_{2int}$, expressed in meters $L_{ext}$: common length of blades $L_{1ext}$ and $L_{2ext}$, expressed in meters $F_l$: common width of longitudinal slots $FL_1$ and $FL_2$ in extensions $P_1$ and $P_2$, measured parallel to the faces of the wafer and expressed in meters E: Young's modulus of the wafer material, expressed in newtons per square meter ($N/m^2$)

$\rho$: density of the wafer material, expressed in kilograms per cubic meter ($kg/m^3$).

To allow compensation at the foot Pd for the momentum components that are parallel to axis Xc, it is also necessary for dimensions $e_{int}$, $e_{ext}$, $L_{1int}$ and $L_{ext}$ to satisfy the following condition (equation 2):

$$\left(\frac{e_{ext}}{e_{int}}\right)^{0.5} \cdot \frac{\left(\frac{L_{ext}}{e_{ext}}\right)^3 - \left(\frac{L_{int}}{e_{int}}\right)^3}{\left(\frac{L_{ext}}{e_{ext}}\right)^3 + \left(\frac{L_{int}}{e_{int}}\right)^3} \cong 0.64$$

However, this condition means that slenderness $L_{ext}/e_{ext}$ of each of blades $L_{1ext}$, $L_{2ext}$ is greater than slenderness $L_{int}/e_{int}$ of each of blades $L_{1int}$, $L_{2int}$. Equation 2 can also be written in the following form (equation 3):

$$\frac{L_{ext}}{L_{int}} = \frac{e_{ext}}{e_{int}} \cdot \left(\frac{1+k}{1-k}\right)^{1/3} \text{ with } k = 0.64 \cdot \left(\frac{e_{int}}{e_{ext}}\right)^{1/2}$$

Positivity of 1−k makes it possible to give a first bound for quotient $e_{ext}/e_{int}$: this quotient is greater than 0.4.

Moreover, by construction, the following equation links the lengths of blades $L_{ext}$ and $L_{int}$, via the angle α which separates the two beams $P_1$ and $P_2$ (equation 4):

$$L_{ext} = L_{int} + \frac{2 \cdot F_l + e_{int} + e_{ext}}{2 \cdot \tan\left(\frac{\alpha}{2}\right)}$$

These last three equations, with the five unknowns $e_{ext}$, $e_{int}$, $L_{ext}$, $L_{int}$ and $F_l$, allow the person skilled in the art to choose the dimensions of the resonator according to the intended applications and the technological constraints, in particular according to the space available for the resonator in each application.

For example, with a crystal wafer of the trigonal system of symmetry class 32, such as α-quartz which is piezoelectric, and for an angle α of 60° between the two beams $P_1$ and $P_2$, each oriented parallel to a crystallographic axis Yc, one parallel to Yc+ and the other to Yc−, to guarantee symmetry of the resonator as obtained by chemical etching as has already been explained, it is possible to calculate the dimensions of a balanced resonator with a slenderness $P_{int}=L_{int}/e_{int}$ common to blades $L_{1int}$ and $L_{2int}$ which is between 3 and 10, and another slenderness $P_{ext}=L_{ext}/e_{ext}$ common to blades $L_{1ext}$ and $L_{2ext}$ which is between 8 and 30, and with a quotient $e_{int}/e_{ext}$ which is between 1 and 5. For example, $L_{1int}$~2.5 mm (millimeters), $e_{int}$~0.24 mm, $L_{ext}$~3.3 mm, $e_{ext}$~0.15 mm, and $F_f$~0.27 mm, producing a vibration frequency F of the resonator which is equal to 32 kHz (kilohertz). This same value of 32 kHz for the frequency F can also be obtained with $L_{int}$~4.95 mm, $e_{int}$~1.5 mm, $L_{ext}$~8.9 mm, $e_{ext}$~1.7 mm, and $F_f$~0.7 mm, which shows the extent of the dimensional possibilities for obtaining a balanced resonator when using the invention.

For resonators intended for flexural vibration, the intrinsic quality factor of the resonator is limited by the thermoelastic losses generated by heat exchange between the fibers of each blade which are compressed and stretched during vibration, as has been theorized in the article by C. Zener, entitled "Internal friction in solids", Physical Review 52, August 1937, pp. 230-235. In the case of quartz and for a simple beam having flexural vibration at a frequency between a few kilohertz and a few hundred kilohertz, the thermoelastic quality factor is proportional to the frequency F of the resonator, multiplied by the square of the vibrating thickness: $Q_{thermoelastic}(quartz) \propto F \cdot e^2$. In the case of silicon and for the same frequency interval, this thermoelastic factor is proportional to the frequency F of the resonator divided by the square of the vibrating thickness e: $Q_{thermoelastic}(silicon) \propto F/e^2$, which leads to very different dimensional determinations for the resonators, between these two crystals. Thus, in the case of quartz and when frequency stability performance is desired for the resonator, dimensional determinations which correspond to significant values for the thicknesses $e_{int}$ and $e_{ext}$ are preferred, and conversely for silicon.

In comparison to a resonator configuration in accordance with [FIG. 4a], adding the stem Pc modifies the momentum which is generated along axis Xc by the vibration: a momentum component of the stem Pc is added to those of the blades $L_{1int}$ and $L_{2int}$. It thus makes it possible to increase the possibilities for dimensional determinations which produce resonator balance. In particular, the addition of the stem Pc allows increasing thickness $e_{ext}$ of blades $L_{1ext}$ and $L_{2ext}$ in comparison to the configuration of [FIG. 4a] which has no stem.

Again in comparison to a resonator configuration in accordance with [FIG. 4a], the addition of inertial masses $MI_1$ and $MI_2$ to the distal ends of beams $P_1$ and $P_2$ also makes it possible to modify the distribution of momentum between all parts of the vibrating portion. In particular, the addition of inertial masses $MI_1$ and $MI_2$ allows increasing thickness $e_{int}$ of blades $L_{1int}$ and $L_{2int}$ for an equal value of their length $L_{int}$.

Figure 6A:
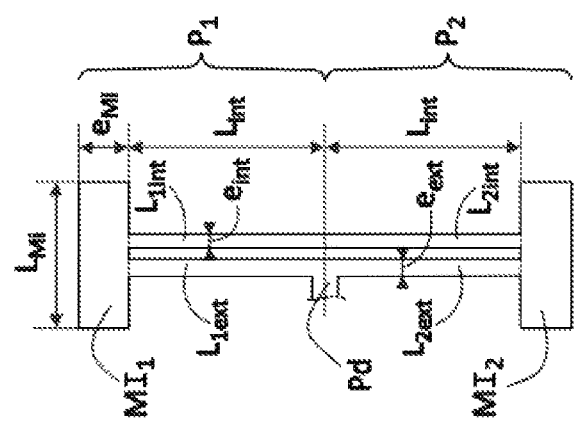
FIG. 6a is a plan view of a second resonator made of piezoelectric material, which is also in accordance with the invention.
Figure 6B:
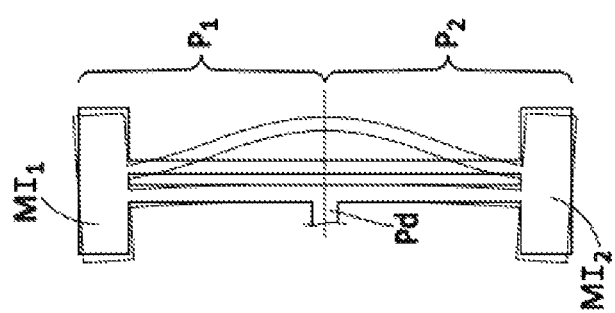
FIG. 6b corresponds to FIG. 6a, showing deformations of the useful mode of vibration of the second resonator.
Figure 6C:
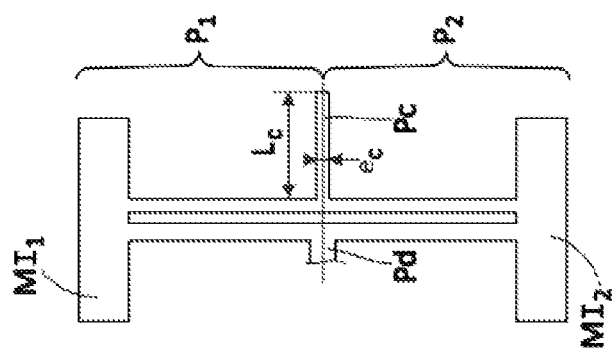
FIG. 6c corresponds to FIG. 6a, when a possible improvement of the invention is used.

The resonator of [FIG. 6a] or [FIG. 6c] corresponds to that of [FIG. 5a] but with angle $\alpha$ being equal to 180° instead of 60°, with no stem for [FIG. 6a] and with a stem Pc for [FIG. 6c]. The lengths of blades $L_{ext}$ and $L_{int}$ then become equal, and the condition of equation 3 for balance of the resonator, previously provided for a resonator with no stem Pc and no inertial masses $MI_1$ and $MI_2$, can no longer be satisfied. The inertial masses $MI_1$ and $MI_2$ are necessary when angle $\alpha$ is equal to 180°, in order to compensate for the momentums. The mode of vibration shown in [FIG. 6b] when the resonator has no stem, or in [FIG. 6d] when the resonator includes the stem Pc, corresponds primarily to a continuous flexural vibration of the blade which is the union of the above two blades $L_{1int}$ and $L_{2int}$, with a total length equal to the sum of their individual lengths, and again with thickness $e_{int}$. The frequency F of the resonator for this mode of vibration can be approximated by the following equation (equation 5):

$$F(\text{in Hertz}) \cong \frac{e_{int}}{L_{int}^2} \cdot \left(\frac{L_{int} \cdot e_{int}}{L_c \cdot e_c + L_{int} \cdot e_{int}}\right)^{3/4} \cdot \sqrt{\frac{E}{\rho}}$$

where:
  $L_{int}$: total blade length measured between the two inertial masses $MI_1$ and $MI_2$, and expressed in meters
  $e_{int}$: width of the blade which is opposite to the foot Pd, measured parallel to the faces of the wafer and expressed in meters
  $L_c$: length of the stem Pc, measured parallel to the faces of the wafer and expressed in meters
  $e_c$: width of the stem Pc, measured parallel to the faces of the wafer and expressed in meters.
  E: Young's modulus of the wafer material, expressed in newtons per square meter (N/m²)
  $\rho$: density of the wafer material, expressed in kilograms per cubic meter (kg/m³).

To allow compensating for the momentums along axis Xc, it is also necessary that dimensions $e_{int}$, $e_{ext}$, $L_{int}$, $e_{Mi}$, $L_c$ and $e_c$ satisfy the following double inequality (equation 6):

$$1 \le \frac{\sqrt{J}}{(L_{int} \cdot e_{int} + L_c \cdot e_c)} \cdot \frac{e_{int}}{e_{ext}} \cdot \sqrt{\frac{e_{int} + e_{ext}}{L_{int}}} \le 3.5$$

with the following additional meanings:
  $e_{ext}$: width of the blade that is connected to the foot Pd, measured parallel to the faces of the wafer and expressed in meters
  $e_{Mi}$: common width of inertial masses $MI_1$ and $MI_2$, measured parallel to the blades and expressed in meters
  $L_{Mi}$: common length of inertial masses $MI_1$ and $MI_2$, measured parallel to axis Xc and expressed in meters
  J: moment of inertia per unit surface area of inertial masses $MI_1$ and $MI_2$, which is equal to (equation 7):

$J = L_{Mi} \cdot e_{Mi} \cdot (L_{Mi}^2 + e_{Mi}^2)$

Figure 6D:
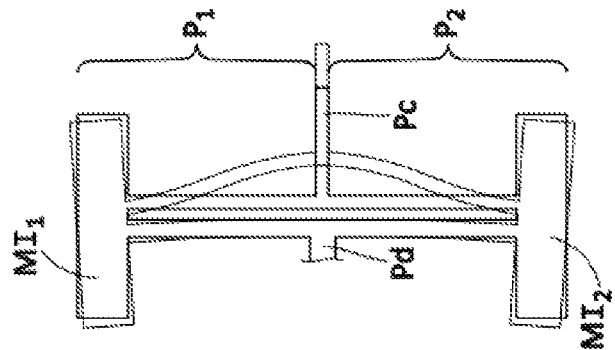
FIG. 6d corresponds to FIG. 6b for the resonator of FIG. 6c.

The double inequality of equation 6 makes it possible to determine the dimensions of the resonators of [FIG. 6a]-[FIG. 6d] so that they are balanced, based on certain values which are initially chosen according to the desired characteristics of these resonators.

It is possible that the dimensional determination for each of the resonators presented above, using the rules provided above, could be continued using numerical simulations such as finite element calculations, to achieve more precise balancing of these resonators.

A resonator as described above can be used to form a gyrometer with one or more sensitive axes. A sensitive axis of a gyrometer is an axis of rotation for which the gyrometer allows measuring the rotational speed about this axis. To obtain a gyrometer with three sensitive axes, making it possible to measure rotational speed components respectively along axes X, Y, and Z, a resonator is necessary for which the angle $\alpha$ is different from 0° and from 180°. Such a resonator for which the angle $\alpha$ is equal to 60° is preferred. During rotation of the resonator, Coriolis acceleration produces additional displacement of each blade of the resonator, which is perpendicular to the displacement of this blade for pilot mode. [FIG. 7a] recalls the simultaneous displacements of beams $P_1$ and $P_2$, as well as of stem Pc, for a resonator in accordance with the invention where a is equal to 60°, and when the mode of vibration which is excited by electrodes, i.e. pilot mode, is the one where the two beams $P_1$ and $P_2$ move in phase opposition parallel to the faces of the wafer, in the manner of a tuning fork. $MV_1$, $MV_2$, and $MV_c$ designate the respective momentums of beams $P_1$, $P_2$ and of stem Pc. [FIG. 7b] shows the corresponding Coriolis accelerations, denoted $\Gamma_C$, which are produced by rotation about axis X, with rotational speed $\Omega_x$; [FIG. 7c] shows those produced by rotation about axis Y, with rotational speed $\Omega_y$; and [FIG. 7d] shows those produced by rotation about axis Z, with rotational speed $\Omega_z$. These Coriolis accelerations are perpendicular to the wafer for rotations about axes X and Y, with the symbol of a dot surrounded by a circle representing a Coriolis acceleration directed towards the reader, and a cross surrounded by a circle representing a Coriolis acceleration oriented in the direction of the reader's gaze. However, the inertial forces which result from these Coriolis accelerations do not compensate at the foot Pd, so it is preferable to provide additional means to limit the losses of vibrational energy occurring through the foot Pd of the resonator. For example, a decoupling structure as described in U.S. Pat. No. 6,414,416, filed by the Applicant, could be used for a gyrometer having a single sensitive axis which is axis X (see [FIG. 7b]), since this decoupling structure is effective in reducing or avoiding a transmission of torsional moments to the attachment part of the resonator via its foot Pd. For a gyrometer with only one sensitive axis which is axis Y (see [FIG. 7c]), the mode of vibration coupled to the pilot mode of [FIG. 7a] by rotational speed $\Omega y$ is a mode where the two beams $P_1$ and $P_2$ undergo out-of-plane bending in phase, and the stem Pc undergoes out-of-plane bending in phase opposition to beams $P_1$ and $P_2$. But the resulting forces do not compensate at the foot Pd of the resonator, and a residual moment is transmitted to the attachment part of the resonator via its foot Pd. The forces generated during rotation about axis Z (see [FIG. 7d]) from the pilot mode of [FIG. 7a] are parallel to the wafer, but also do not compensate.

To achieve compensation of the forces and moments transmitted to the attachment part Pf of the resonator, a new pyrometer is proposed by the invention, which comprises two vibrating portions each similar to that of [FIG. 7a], facing away from each other and with a common foot Pd. Both vibrating portions are fabricated from the same wafer, so their material is continuous across the foot Pd. Such a gyrometer, which is shown in [FIG. 8a]-[FIG. 8d], is effective for measuring rotations about axis X or about axis Y. Two excitation modes of vibration are possible as pilot modes, each of them preserving the balance provided by the double-resonator structure: a phase-opposition mode, in which the two beams $P_1$ and $P_2$ of one of the vibrating portions move apart and move towards each other in phase opposition relative to beams $P_3$ and Pd of the other vibrating portion, as shown in [FIG. 8a], and an in-phase mode, in which the two beams $P_1$ and $P_2$ of one of the vibrating portions move apart and move towards each other in phase with beams $P_3$ and $P_4$ of the other vibrating portion, as shown in [FIG. 8c]. In these two figures, each MV label designates the momentum of the beam or of the stem on which it is superimposed. [FIG. 8b] shows the compensation in the inertial forces which result from Coriolis accelerations $\Gamma_C$ for the excitation mode of vibration of [FIG. 8a] used as pilot mode, and [FIG. 8d] for the excitation mode of vibration of [FIG. 8c] used as pilot mode. One of these two excitation modes is selected as the pilot mode via the configuration of the electrodes on the two vibrating portions.

For example, in the case of piezoelectric quartz crystal or any other piezoelectric crystal in the same symmetry class, the gyrometer can be composed of two vibrating portions located head to tail, each with two beams forming an angle of 60° between them, such that these beams are parallel to crystallographic axes Yc+ and Yc−. [FIG. 9a]-[FIG. 9c] show a set of strips of conducting material which are arranged on the faces of all segments of the two vibrating portions. The two vibrating portions are respectively designated by the letters A and B, and correspond to the section view of [FIG. 9b] for vibrating portion A, and to the section view of [FIG. 9c] for vibrating portion B.

Figure 8A:
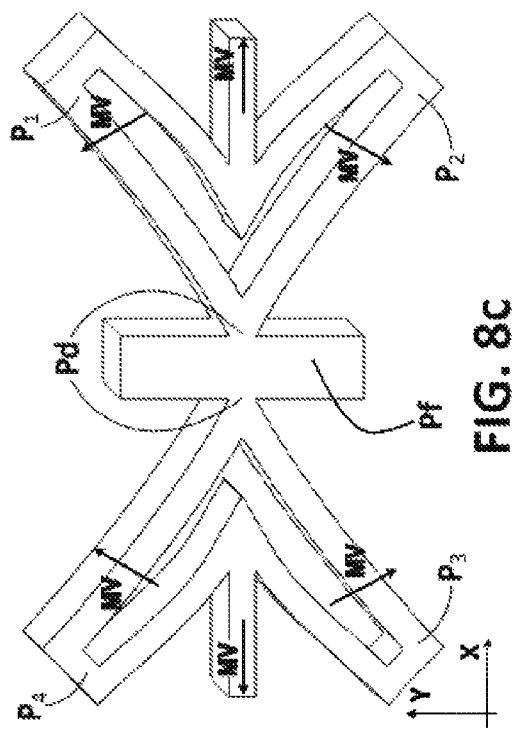
FIG. 8a shows deformations of a second gyrometer also in accordance with the invention, which are generated in a first pilot mode.
Figure 8B:
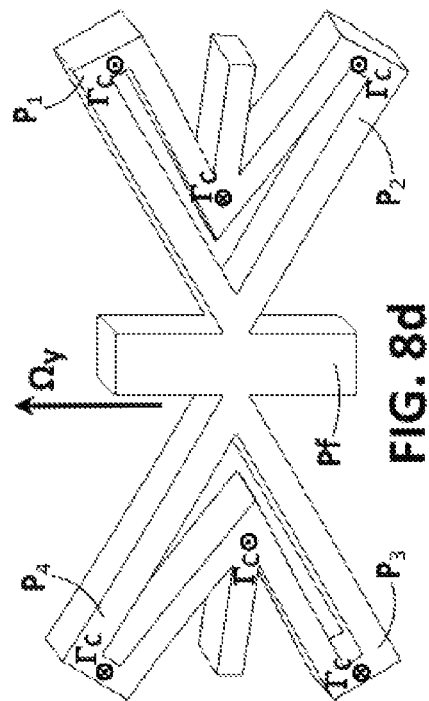
FIG. 8b corresponds to FIG. 8a, showing deformations of a first sensing mode of the second gyrometer which are generated by rotation about a first axis, starting from the first pilot mode.

For a gyrometer in which the sensitive axis is axis X, parallel to crystallographic axis Xc, the pilot mode is the one where the two resonators vibrate in phase opposition, as illustrated by [FIG. 8a]. It is then possible to apply the teachings of US Pat. No. 2012/279303, filed by the Applicant, to limit the capacitive couplings between pilot mode and sensing mode. According to these teachings, strips $el_{3-A}$, $el_{103-A}$, $el_{4-A}$, $el_{104-A}$, $el_{9-A}$, $el_{109-A}$, $el_{10-A}$, $el_{110-A}$, $el_{3-B}$, $el_{103-B}$, $el_{4-B}$, $el_{104-B}$, $el_{9-B}$, $el_{110-B}$, $el_{110-B}$ are used to excite pilot mode by electrically connecting them to a source of alternating voltage V, and $el_{2-A}$, $el_{102-A}$, $el_{5-A}$, $el_{105-A}$, $el_{8-A}$, $el_{108-A}$, $el_{11-A}$ and $el_{1110-A}$ are used to detect the amplitude of the pilot mode. Thus, strips $el_{1-A}$, $el_{101-A}$, $el_{6-A}$, $el_{106-A}$, $el_{7-A}$, $el_{107-A}$, $el_{12-A}$, $el_{112-A}$, $el_{1-B}$, $el_{101-B}$, $el_{6-B}$, $el_{106-B}$, $el_{7-B}$, $el_{107-B}$, $el_{12-B}$ and $el_{112-B}$ can be used to detect movements which are generated by rotation about axis X, but by connecting strips $el_{1-A}$, $el_{6-A}$, $el_{7-A}$, $el_{12-A}$, $el_{1-B}$, $el_{6-B}$, $el_{7-B}$ and $el_{12-B}$ on the one hand, and strips $el_{101-A}$, $el_{106-A}$, $el_{107-A}$, $el_{112-A}$, $el_{101-B}$, $el_{107-B}$ and $el_{112-B}$ on the other hand, respectively to the input terminals of a differential amplifier which is part of an electrical current detector.

Figure 8C:
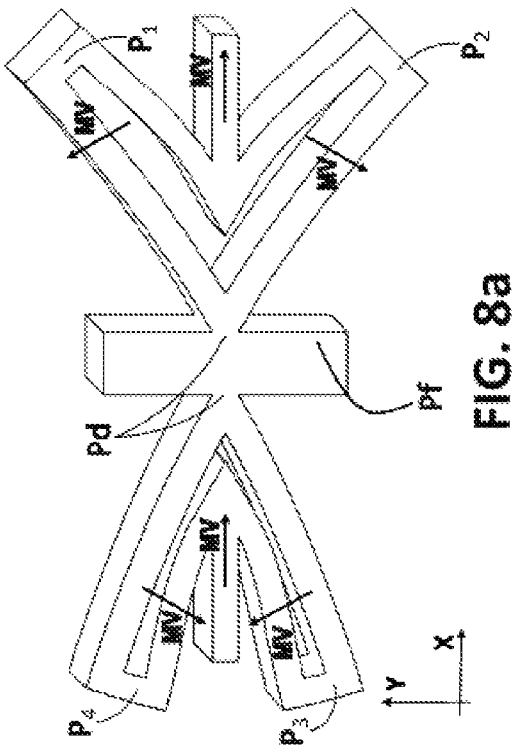
FIG. 8c shows other deformations of the second gyrometer which are generated in a second pilot mode.
Figure 8D:
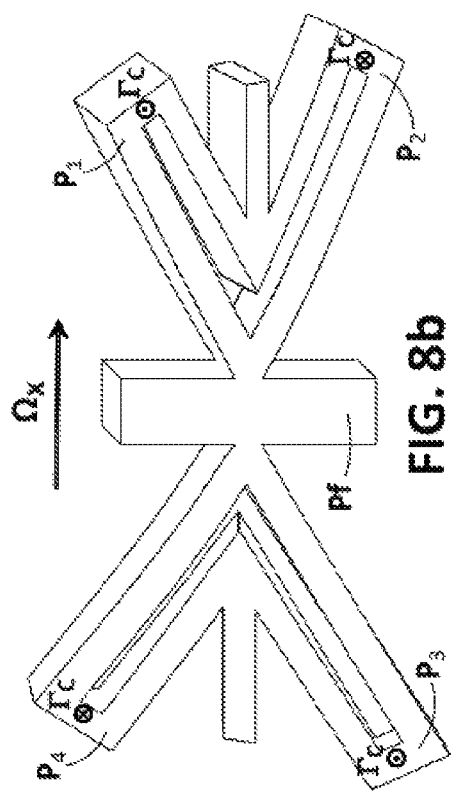
FIG. 8d corresponds to FIG. 8b, showing deformations of a second sensing mode of the second gyrometer which are generated by rotation about a second axis, starting from the second pilot mode.

For a gyrometer whose sensitive axis is axis Y, perpendicular to axis Xc of the crystal and in the common plane of axes Xc, Yc+, and Yc−, the pilot mode is the one with the two resonators which vibrate in phase, as illustrated by [FIG. 8c], $el_{1-A}$, $el_{101-A}$, $el_{6-A}$, $el_{106-A}$, $el_{7-A}$, $el_{107-A}$, $el_{12-A}$, $el_{112-A}$, $el_{1-B}$, $el_{101-B}$, $el_{6-B}$, $el_{106-B}$, $el_{7-B}$, $el_{107-B}$, $el_{12-B}$ and $el_{112-B}$ then make it possible to excite this pilot mode by connecting them to the source of alternating voltage V, and strips $el_{2-A}$, $el_{102-A}$, $el_{5-A}$, $el_{105-A}$, $el_{8-A}$, $el_{108-A}$, $el_{11-A}$, $el_{111-A}$, $el_{2-B}$, $el_{102-B}$, $el_{5-B}$, $el_{105-B}$, $el_{8-B}$, $el_{108-B}$, $el_{11-B}$ and $el_{111-B}$ are used to detect the amplitude of the pilot mode. In this case, strips $el_{3-A}$, $el_{103-A}$, $el_{4-A}$, $el_{104-A}$, $el_{9-A}$, $el_{109-A}$, $el_{10-A}$, $el_{110-A}$, $el_{3-B}$, $el_{103-B}$, $el_{4-B}$, $el_{104-B}$, $el_{9-B}$, $el_{109-B}$, $el_{10-B}$ and $el_{110-B}$ can be used to detect movements which are generated by rotation about axis Y, but connecting by strips $el_{3-A}$, $el_{4-A}$, $el_{9-A}$, $el_{10-A}$, $el_{103-B}$, $el_{104-B}$, $el_{10-B}$ and $el_{110-B}$ on the one hand, and strips $el_{103-A}$, $el_{104-A}$, $el_{109-A}$, $el_{110-A}$, $el_{3-B}$, $el_{4-B}$, $el_{9-B}$ et $el_{10-B}$ on the other hand, respectively to the input terminals of the differential amplifier which is part of the electrical current detector.

Another application of resonators according to the invention is the implementation of a force sensor. The force sensor, as shown in [FIG. 10a], is based on two identical vibrating portions which are again produced in a same wafer, again oriented to be opposite to each other but which are joined by their stems Pc. Each of the two vibrating portions is sized to be individually balanced. Beams $P_1$ and $P_2$ of one of the two vibrating portions, and beams $P_3$ and $P_4$ of the other vibrating portion, between them form angles of 60°. This association of the two vibrating portions makes it possible to obtain a double-resonator whose two ends, formed by the respective feet of the individual vibrating portions, are without or almost without residual motion, as shown by [FIG. 10b], for a mode of vibration where the two vibrating portions vibrate in phase opposition. When this sensor is subjected to an axial tensile force, the static deformation imposed on the double-resonator modifies its flexural inertia. [FIG. 10c] shows this static deformation for axial tensile force T.

Figure 10A:
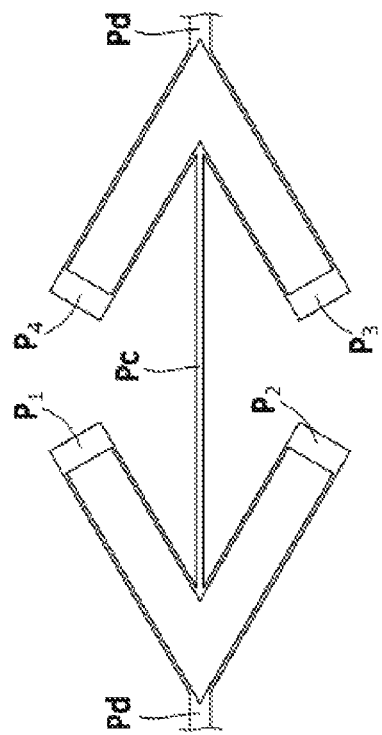
FIG. 10a is a plan view of first force e sensor which is in accordance with the invention.
Figure 10B:
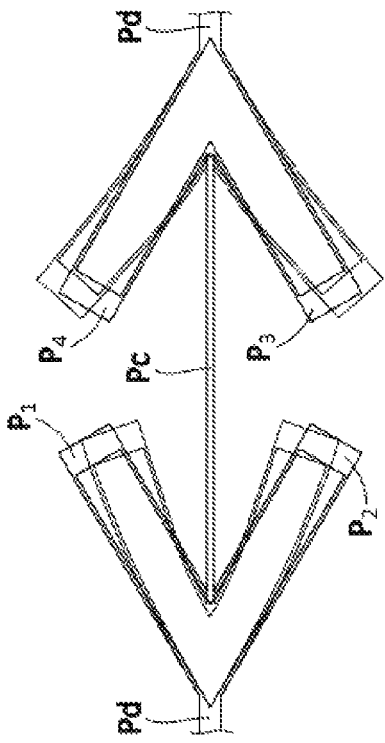
FIG. 10b corresponds to FIG. 10a, showing deformations associated with a useful mode of vibration of the first force sensor.
Figure 10C:
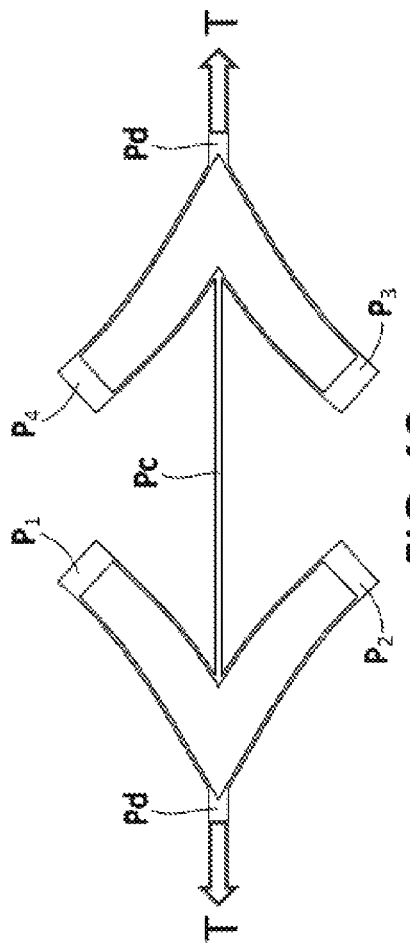
FIG. 10c corresponds to FIG. 10a, showing a static deformation of the first force sensor when subjected to an axial tensile force.
Figure 11A:
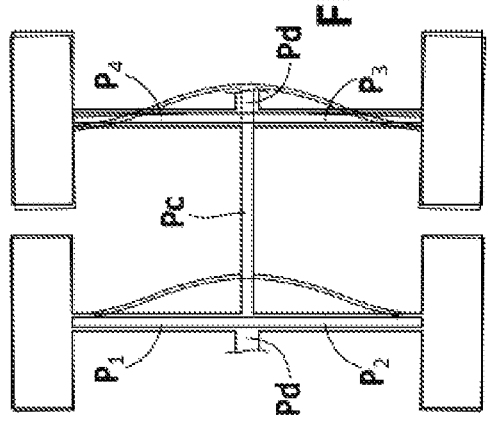
FIG. 11a corresponds to FIG. 10a for a second force sensor which is also in accordance with the invention.
Figure 11B:
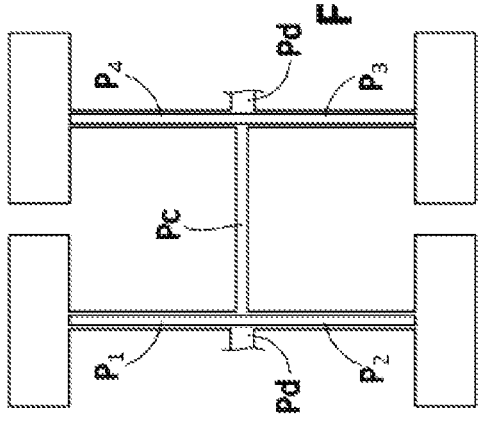
FIG. 11b corresponds to FIG. 10b for the second force sensor.
Figure 11C:
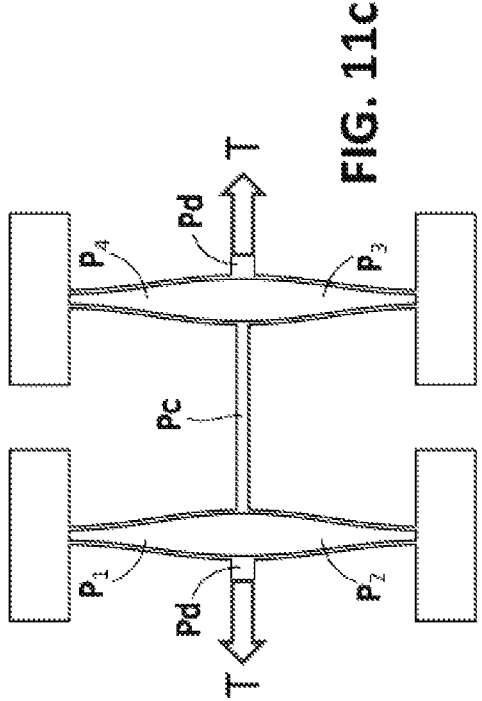
FIG. 11c corresponds to FIG. 10c for the second force sensor.

If such a force sensor is made of quartz crystal, two configurations are possible, which correspond either to an angle α which is equal to 60°, as shown in [FIG. 10a]-[FIG. 10c], or to an angle α which is equal to 180°, as shown in [FIG. 11a]-[FIG. 11c]. Thus, [FIG. 11a] shows the configuration with two vibrating portions for which beams $P_1$ and $P_2$ on the one hand, and $P_3$ and $P_4$ on the other hand, form an angle of 180° between them. [FIG. 11b] shows an instantaneous deformation of the double-resonator structure of [FIG. 11a], for the mode of vibration of interest where the two vibrating portions vibrate in phase. [FIG. 11c] shows the static deformation of the same force sensor when it is subjected to axial tensile force T. For the case where the angle α is equal to 180°, the variation in relative frequency F of the mode of vibration considered, induced by axial tensile force T, is proportional to (equation 8):

$$\frac{\Delta F}{F} \propto T \cdot \left[\left(\frac{e_{int}}{L_{int}}\right)^3 + \left(\frac{e_{ext}}{L_{ext}}\right)^3\right]$$

Using Equation 8, those skilled in the art can determine the dimensions of the force sensor according to each application and to the measurement sensitivity that is appropriate for it.

It is understood that the invention can be reproduced by modifying secondary aspects of the embodiments described in detail above, while retaining at least some of the cited advantages. In particular, the material of the wafer is not necessarily a piezoelectric monocrystalline material. For example, the wafer can be made of monocrystalline or polycrystalline silicon, or it can be a piezoelectric ceramic, or a combination of a metal and piezoelectric ceramics. The means for vibration excitation and detection must then be adapted according to each material. For example, excitation can be achieved using electrostatic forces, magnetic force, or by implementing a photo-thermal effect, etc., and detection can be achieved by measuring a variation in the capacitance of a capacitor formed between a portion of the resonator which is moving and a portion which is stationary, or by using a piezoresistive effect, or by measuring with optical interferometry, etc. Finally, all the numerical values that have been cited have been provided for illustration purposes only, and may be changed according to the application considered.

The invention claimed is:

1. A resonator comprising:
    a portion of a wafer having two opposite faces which are flat and parallel, the wafer portion being intended to vibrate flexurally during use of the resonator, and referred to as the vibrating portion; and
    a support part, which is external to the vibrating portion and connected thereto by an intermediate segment of the wafer referred to as a foot, said foot being integral with the vibrating portion and forming a rigid connection between the support part and said vibrating portion,
    the vibrating portion having a first plane of symmetry, referred to as the midplane, which is parallel to both faces of the wafer and equidistant from said two faces, and a second plane of symmetry, referred to as the plane of symmetry orthogonal to the wafer, which is perpendicular to the midplane and which passes longitudinally through the connection formed by the foot between the support part and the vibrating portion,
    an intersection between the midplane and the plane of symmetry orthogonal to the wafer constituting a center axis of the vibrating portion,
    the vibrating portion comprising two extensions which are each intended to vibrate flexurally, said two extensions extending symmetrically from the foot on each side of the plane of symmetry orthogonal to the wafer,
    wherein each extension is provided with a longitudinal slot which passes through the vibrating portion perpendicularly to the midplane, from the plane of symmetry orthogonal to the wafer towards a distal end of said extension but without reaching said distal end, so that each extension is meander shaped, the respective slots of the two extensions being symmetrical relative to the plane of symmetry orthogonal to the wafer, and meeting at said plane of symmetry orthogonal to the wafer, so that the vibrating portion comprises two primary segments which each connect the foot to the distal end of one of the extensions, and two secondary segments which are interconnected at the plane of symmetry orthogonal to the wafer by respective proximal ends of said secondary segments, and which each extend to the distal end of one of the extensions so as to connect to one of the primary segments at said distal end,
    such that for a mode of vibration of the vibrating portion which comprises only movements parallel to the midplane, and which is symmetrical relative to the plane of symmetry orthogonal to the wafer, both primary segments have instantaneous velocity components, parallel to the center axis, which at each instant during vibration, are in the opposite direction to that of instantaneous velocity components of the secondary segments, also parallel to the center axis.

2. The resonator of claim 1, wherein the vibrating portion has a distribution of mass such that the mode of vibration, which only comprises movements parallel to the midplane and which is symmetrical relative to the plane of symmetry orthogonal to the wafer, does not cause movement of the foot parallel to the center axis.

3. The resonator of claim 1, wherein a material of the wafer is monocrystalline and of trigonal class and piezoelectric, and wherein: the center axis of the vibrating portion is parallel to an axis Xc of said material, and both primary segments as well as both secondary segments of the vibrating portion are parallel to axes Yc of said material.

4. The resonator of claim 3, wherein both extensions of the vibrating portion form an angle between them which is equal to 60° or 180°.

5. The resonator of claim 3, further comprising:
    excitation means, adapted for generating flexural deformations of the vibrating portion, said excitation means comprising first and second electrodes which are electrically insulated from each other, said first electrode comprising, on each face of the wafer and for each primary or secondary segment, a strip of electrically conducting material which is arranged longitudinally on said segment, centrally within a width of said segment, and the second electrode comprising, also on each face of the wafer and for each primary or secondary segment, two strips on said segment which are arranged on two opposite sides of the strip of the first electrode; and
    detection means, adapted for measuring an amplitude of flexural deformations of the vibrating portion which are generated by the excitation means during use of the resonator, said detection means comprising a circuit for detecting an electrical current which appears in the first and second electrodes.

6. The resonator of claim 1, wherein each extension comprises, at its distal end and parallel to the midplane, a widening relative to the outer longitudinal edges of the primary and secondary segments of said extension.

7. The resonator of claim 1, further comprising an additional portion of the wafer, in the form of a segment and referred to as a stem, which extends from the interconnected proximal ends of the secondary segments, parallel to the center axis and in a direction away from the foot.

8. The resonator of claim 7, comprising two vibrating portions formed in the same wafer, provided with respective stems, said two vibrating portions being interconnected by said stems, and oriented opposite to each other so that the respective center axes of said two vibrating portions are superimposed.

9. A force sensor, comprising the resonator of claim 8, and adapted for measuring a tensile force which is applied between the respective feet of both vibrating portions and which is parallel to the center axes of said two vibrating portions.

10. The resonator of claim 1, comprising two vibrating portions formed in the same wafer, both vibrating portions being interconnected by the respective feet of said two vibrating portions, and oriented opposite to each other so that the respective center axes of said two vibrating portions are superimposed.

11. A rate gyro, comprising at least one resonator according to claim 1.

* * * * *